United States Patent
Silberman et al.

(10) Patent No.: US 10,919,763 B2
(45) Date of Patent: Feb. 16, 2021

(54) METHOD FOR CATALYTICALLY INDUCED HYDROLYSIS AND RECYCLING OF METAL BOROHYDRIDE SOLUTIONS

(71) Applicant: ELECTRIQ-GLOBAL ENERGY SOLUTIONS LTD., Tirat Carmel (IL)

(72) Inventors: Alex Silberman, Haifa (IL); Dvir Cohen, Nesher (IL); Yaniv Duchovny, Hedera (IL)

(73) Assignee: ELECTRIQ-GLOBAL ENERGY SOLUTIONS LTD, Tirat Carmel (IL)

( * ) Notice: Subject to any disclaimer, the term of this patent is extended or adjusted under 35 U.S.C. 154(b) by 96 days.

(21) Appl. No.: 16/120,462

(22) Filed: Sep. 4, 2018

(65) Prior Publication Data

US 2018/0370797 A1  Dec. 27, 2018

Related U.S. Application Data

(62) Division of application No. 15/553,997, filed as application No. PCT/IL2016/050245 on Mar. 3, 2016, now Pat. No. 10,351,425.

(30) Foreign Application Priority Data

Mar. 5, 2015  (IL) .......................... 237580
Mar. 26, 2015  (IL) .......................... 23795

(51) Int. Cl.
   *C01B 6/21* (2006.01)
   *C01B 3/06* (2006.01)
   (Continued)

(52) U.S. Cl.
   CPC ............ *C01B 6/21* (2013.01); *B01J 27/1853* (2013.01); *B01J 37/348* (2013.01); *C01B 3/065* (2013.01);
   (Continued)

(58) Field of Classification Search
   CPC .. C01B 6/21; C01B 6/17; C01B 3/065; C01B 3/344; Y02E 60/362; B01J 27/1853; B01J 37/348
   See application file for complete search history.

(56) References Cited

U.S. PATENT DOCUMENTS

| 3,140,150 A | 7/1964 | Goerrig et al. |
| 3,379,511 A | 4/1968 | Knorre et al. |

(Continued)

FOREIGN PATENT DOCUMENTS

| CN | 1778668 | 5/2006 |
| CN | 102806093 | 12/2012 |

(Continued)

OTHER PUBLICATIONS

Ng et al., "Structure and Crystallization of Nickel-Phosphorus Alloys Prepared by High-Rate Electrodeposition," J. Electrochem. Soc.: Electrochemical Science and Technology, Jun. 1988, 1376-1381. (Year: 1988).*

(Continued)

*Primary Examiner* — Anthony J Zimmer
(74) *Attorney, Agent, or Firm* — Pearl Cohen Zedek Latzer Baratz LLP

(57) ABSTRACT

The process for obtaining $M^1$-$BH_4$, the process comprising contacting $M^1$-$BO_2$ with a metal $M^2$ in the presence of molecular hydrogen ($H_2$) under conditions permitting the formation of $M^1$-$BH_4$ and $M^2$-oxide, wherein the $M^1$ is a metal selected from column I of the periodic table of elements or alloys of metals selected from column I of the periodic table of elements and $M^2$ is a metal or an alloy of metals selected from column II of the periodic table of elements, provided that $M^2$ is not Mg and $M^1$ is different from $M^2$.

8 Claims, 10 Drawing Sheets

(51) Int. Cl.
    *C01B 6/17*    (2006.01)
    *B01J 37/34*   (2006.01)
    *B01J 27/185*  (2006.01)
    *C01B 3/34*    (2006.01)

(52) U.S. Cl.
    CPC ........... *C01B 3/344* (2013.01); *C01B 6/17* (2013.01); *Y02E 60/36* (2013.01)

(56) References Cited

U.S. PATENT DOCUMENTS

| | | | |
|---|---|---|---|
| 7,029,641 | B2 | 4/2006 | Yamamoto et al. |
| 7,288,236 | B2 | 10/2007 | Hauk et al. |
| 8,377,405 | B2 | 2/2013 | Chin et al. |
| 2004/0249215 | A1 | 12/2004 | Suda et al. |
| 2006/0106195 | A1 | 5/2006 | Kong |
| 2006/0293173 | A1 | 12/2006 | Zhang et al. |
| 2009/0196821 | A1* | 8/2009 | Palanichamy ....... B01J 37/0219 423/648.1 |
| 2009/0214417 | A1 | 8/2009 | Prasad et al. |
| 2010/0012499 | A1 | 1/2010 | Zhou et al. |

FOREIGN PATENT DOCUMENTS

| | | | |
|---|---|---|---|
| CN | 103103562 | | 5/2013 |
| CN | 104046967 | | 9/2014 |
| CN | 104091958 | | 10/2014 |
| EP | 1424310 | | 6/2004 |
| EP | 1645644 | | 4/2006 |
| EP | 1586536 | | 3/2008 |
| JP | 2002-241109 | | 2/2002 |
| JP | 2005-314225 | | 11/2005 |
| JP | 2006-104055 | | 4/2006 |
| JP | 2011-032131 | | 2/2011 |
| KR | 20140075029 | A * | 6/2014 |
| RU | 2344071 | | 1/2009 |
| SU | 283061 | | 9/1970 |
| WO | WO 98/08992 | | 3/1998 |
| WO | WO 2008/082491 | | 7/2008 |
| WO | WO 2010/010560 | | 1/2010 |

OTHER PUBLICATIONS

Office Action dated Jul. 23, 2019 from correcponding Russian Application No. 2017132484.

Soloveichik "Metal Borohydrides as Hydrogen Storage Materials" Material Matters 2007, 2:2, 11, pp. 1-6.

Office action for CN patent application No. 2016800188978, dated Nov. 26, 2019.

Office action for JP patent Application No. 2017-546903, dated Jan. 28, 2020.

Liu et al 2008, "Kinetic Characteristics of Sodium Borohydride Formation When Sodium Meta-Borate Reacts With Magnesium and Hydrogen" Int Journal of Hydrogen Energy, vol. 33, pp. 1323-1328.

Supplementary European Search Report in EP 16 75 8563, dated Oct. 29, 2018.

European Search Report in EP 18 19 2862, dated Nov. 2, 2018.

Yoshitsugu Kojima et al; Recycling process of sodium metaborate to sodium Borohydride; International Journal of Hydrogen Energy 28 (2003) 989-993; Jul. 23, 2002; Available online at www.sciencedirect.com.

Office Action dated Aug. 11, 2020 for corresponding Israeli Application No. 254217.

Deog-Ryung Kim et al.; Fabrication of porous Co—Ni—P catalysts by electrodeposition and their catalytic characteristics for the generation of hydrogen from an alkaline NaBH4 solution; *International journal of hydrogen energy*, vol. 34, pp. 2622-2630, Feb. 20, 2009.

Yuegiang Huang et al.; Accurately measuring the hydrogen generation rate for hydrolysis of sodium borohydride on multiwalled carbon nanotubes/Co-B catalysts; *International journal of hydrogen energy*, vol. 33, pp. 7110-7115, Nov. 7, 2008.

Guo Yue-ping; Hydrogen Generation from NaBH Solution with Electroplated Alloy Catalysts; Research and Exploration in Laboratory; vol. 34; No. 1, Jan 2015.

Taek Hyun Oh et al; Performance evaluation of hydrogen generation system with electroless-deposited CoeP/Ni foam catalyst for NaBH4 hydrolysis; International Journal of Hydrogen Energy 38; Available online Apr. 11, 2013.

Yueping Guo et al; The hydrogen generation from alkaline NaBH4 solution by using electroplated amorphous Co—Ni—P film catalysts; Applied Surface Science 273 (2013) 253— 256; Available online Feb. 15, 2013.

Sen-Lin Wang; Studies of electroless plating of Ni—Fe—P alloys and the influences of some deposition parameters on the properties of the deposits; Science Direct: Surface & Coatings Technology 186 (2004) 372-376; Available online Mar. 27, 2004.

Office Action dated Sep. 24, 2020 for corresponding Chinese Application No. 2018106806382.

* cited by examiner

METHOD FOR CATALYTICALLY INDUCED HYDROLYSIS AND RECYCLING OF METAL BOROHYDRIDE SOLUTIONS

CROSS-REFERENCE TO RELATED APPLICATIONS

This application is a continuation of U.S. application Ser. No. 15/553,997, filed on Aug. 27, 2017, which is a National Phase Application of PCT International Application No. PCT/IL2016/050245, International Filing Date Mar. 3, 2016, claiming the benefit of Israeli Patent Application No. 237580, filed Mar. 5, 2015 and Israeli Patent Application No. 237950, filed Mar. 26, 2015, all of which are hereby incorporated by reference.

FIELD OF THE INVENTION

The invention is directed to a one-pot synthesis process for converting metal-metaborate to metal-borohydride. The invention is further directed to a process for depositing a Co—P alloy onto a substrate by induced electrical potential in a predefined range, used, for example, in the preparation of a catalyst for the decomposition of metal borohydride, such that the metal borohydride may be used as a fuel in a fuel cell. Further aspects of the invention are directed to the recycling of metal and metal oxide components participating in the process for converting metal-metaborate to metal-borohydride.

BACKGROUND OF THE INVENTION

Hydrogen has attracted attention in the past decades as a source for clean energy production, envisioned to be utilized in fuel cells due to its capability to release energy with high efficiency through electro-oxidation reactions. Conventional hydrogen energy conversion systems are typically based on hydrogen storage in the form of pressurized molecular hydrogen, liquefied hydrogen, carbonaceous materials, and as atomic hydrogen in metal hydrides.

The use of metal-borohydrides, for example sodium borohydride ($NaBH_4$), as a source of available hydrogen has been suggested, mainly due to their relatively high hydrogen content. Such metal-borohydrides have been contemplated for use in hydrogen storage systems, where controlled release of hydrogen is desired, owing to their higher gravimetric capacity (compared to metal hydrides) and higher volumetric capacity (compared to compressed and liquefied hydrogen). The alkaline solutions disclosed therein may be directly used to power fuel cells.

The common process known in the art for the preparation of sodium borohydride is the Schlesinger method, generally summarized in equation (1), starting from sodium hydride and methyl borate:

$$4NaH + B(OCH_3)_3 \rightarrow NaBH_4 + 3NaOCH_3 \quad \text{(eq. 1)}$$

The Schlesinger process has been widely used in the pharmaceutical field, and is based on a multi-stage process which yields a high purity grade sodium borohydride. Therefore, sodium borohydride produced by the Schlesinger method is often too costly to be utilized in large-quantities and commercial processes, in which a high purity grade of metal-borohydride is not required.

For large scale utilization, such as in full cells and commercial hydrogen generators, there is a need for simple and cost effective production of metal borohydride.

Scarce research has been carried out thus far on synthesis processes that may have the potential of providing commercial, bulk quantities of metal-borohydride in a cost-effective manner; research has been mainly focused on synthesis of sodium borohydride starting from sodium metaborate. However, to date such processes have yet to be commercialized.

Further, hydrogen has attracted attention in the past decades as a source for clean energy production, envisioned to be utilized in fuel cells due to its capability to release energy with high efficiency through electro-oxidation reactions. Conventional hydrogen energy conversion systems are typically based on hydrogen storage in the form of pressurized molecular hydrogen, liquefied hydrogen, carbonaceous materials, or as atomic hydrogen in metal hydrides.

Use of metal-borohydrides, for example sodium borohydride ($NaBH_4$), as a source of available hydrogen has been suggested, mainly due to their relatively high hydrogen content. Such meal-borohydrides have been contemplated for use in hydrogen storage systems, where controlled release of hydrogen is desired, due to their higher gravimetric capacity (compared to metal hydrides) and higher volumetric capacity (compared to compressed and liquefied hydrogen).

Typically, at certain pH values, $NaBH_4$ and $KBH_4$ form relatively stable aqueous solutions, which can be stored for prolonged periods of time without significant decomposition. However, due to their stability in highly alkaline solutions, hydrolysis for obtaining the desired hydrogen gas often requires the use of a catalyst for reducing the activation energy and promoting the decomposition of the metal-borohydride. Such typical catalysts known in the art are ruthenium, rhodium and platinum-based, which are relatively expensive, thereby increasing the costs of the hydrogen generating systems comprising them. Other known catalysts are organometallic complexes.

As the processes known in the art are either costly or require relatively complex synthesis, there exists a need for simpler processes for production of catalysts for promoting decomposition of metal-borohydrides in aqueous solutions. The required catalysts should be cost effective, provide controlled decomposition rates and show stability and efficiency over prolonged periods of usage in alkaline solutions.

SUMMARY OF EMBODIMENTS OF THE INVENTION

Embodiments of the invention are directed to A process for obtaining $M^1$-$BH_4$, the process comprising contacting $M^1$-$BO_2$ with a metal $M^2$ in the presence of molecular hydrogen ($H_2$) under conditions permitting the formation of $M^1$-$BH_4$ and $M^2$-oxide, wherein the $M^1$ is a metal selected from column I of the periodic table of elements or alloys of metals selected from column I of the periodic table of elements and $M^2$ is a metal or an alloy of metals selected from column II of the periodic table of elements, provided that $M^2$ is not Mg and $M^1$ is different from $M^2$.

Further embodiments of the invention are directed to a process for preparing a metal-borohydride decomposition catalyst, the process comprising depositing an alloy of formula $M^3_xR$ onto a surface of a cathode, the deposition being carried out in a solution under induced constant cathode potential, M being a reduced metal, R being an element selected from P, B and N, and x being between 2 and 3.

In addition, embodiments of the invention are directed to a process for recycling a metal oxide $M^2$-oxide and a metal $M^2$, the process comprising:

reacting the $M^2$-oxide with a hydrocarbon at a temperature between 1400-2200° C., thereby providing gaseous CO, $H_2$ and metal $M^2$;

cooling to a temperature below 600-700° C., thereby condensing metal $M^2$;

separating condensed metal $M^2$ from CO and $H_2$;

reacting $M^2$ with $M^1$-$BO_2$, according to the process of claim 1, thereby providing $M^2$-oxide; and repeating the previous steps as many times as required.

According to some embodiments, the hydrocarbon is selected from $CH_4$, $C_2H_6$, $C_3H_8$, $C_4H_{10}$ or any combination thereof.

Embodiments of the invention are directed to a metal-borohydride decomposition catalyst prepared according to any of the processes detailed herein.

According to some embodiments, the metal borohydride decomposition catalyst detailed herein may be used in providing a predefined amount of hydrogen by contacting the metal borohydride decomposition catalyst with a stable borohydride solution.

According to some embodiments, $M^1$ is selected from Li, Na and K. According to some embodiments, $M^2$ is selected from Be, Ca, Sr, Ba, and alloys thereof or Mg-alloys of Be, Ca, Sr, and Ba. According to some embodiments, $M^2$ is a metal having a Pauling electronegativity value of ≤1.6 or alloys thereof. According to some embodiments, $M^2$ is a metal that forms $M^2$-hydrides having a decomposition temperature of 750° C. or less. According to some embodiments, the process for recycling a metal oxide $M^2$-oxide and a metal $M^2$ is carried out at a temperature of between about 200 and 1000° C.

According to some embodiments, the molecular hydrogen is provided at a pressure of at least 10 bars. According to some embodiments, $M^2$ has a particle size of between about 0.1 and about 10 μm. According to some embodiments, the contacting in the process for obtaining $M^1$-$BH_4$ is carried out in the presence of at least one catalyst. According to some embodiments, catalyst is selected from Fe, Co, Cu, Ni, Ru, Pt and alloys thereof or the catalyst prepared according to any of the processes detailed herein.

According to some embodiments, the process for obtaining $M^1$-$BH_4$ further comprises separating the catalyst from the $M^1$-$BO_2$ after a predefined amount of $M^1$-$BH_4$ is formed. According to some embodiments, the $M^1$-$BO_2$ and $M^2$ are provided in a ratio of between 1:1 and 1:10.

Embodiments of the invention are further directed to a process for obtaining $M^1$-$BH_4$, the process comprising, comprising:

introducing $M^1$-$BO_2$ and an $M^2$ alloy into a reaction vessel to form a reaction mixture;

heating the reaction mixture under inert atmosphere to a predetermined temperature; and introducing $H_2$ into the reaction vessel to thereby obtain a reaction product comprising $M^1$-$BH_4$, wherein the $M^1$ is a metal selected from column I of the periodic table of elements and $M^2$ is an alloy of metals selected from column II of the periodic table of elements, provided that $M^2$ is not Mg and $M^1$ is different from $M^2$.

According to some embodiments, the $H_2$ is introduced into the reaction vessel at step (c) at a predetermined temperature and pressure for a predetermined period of time. According to some embodiments, the predetermined temperature is between about 200 and about 1000° C. According to some embodiments, the predetermined pressure is at least 10 bars. According to some embodiments, the predetermined period of time is at least 30 minutes. According to some embodiments, the process for obtaining $M^1$-$BH_4$ further comprises step (d) of separating $M^1$-$BH_4$ from the reaction mass. According to some embodiments, the separation is carried out by extraction.

According to some embodiments, the process for obtaining $M^1$-$BH_4$ further comprises introducing a catalyst into the reaction vessel, wherein the catalyst is removed from the reaction vessel at a predetermined time or after a predetermined amount of $M^1$-$BH_4$ is formed. According to some embodiments, the catalyst is introduced at a ratio of between 1:0.01 and 1:1 compared to the $M^1$-$BO_2$. According to some embodiments, the induced constant cathode potential is lower than the reduction potential of $M^3$ cations. According to some embodiments, $M^3$ is selected from Co, Ni, Fe, and any combination thereof. According to some embodiments, x is between 2.2 and 3. According to some embodiments, the cathode is selected from a carbon-based substrate, a metallic substrate and a carbon-based substrate embedded metal. According to some embodiments, the metallic substrate is selected from a nickel plate, a nickel mesh, a cobalt plate, a cobalt mesh, a Ni/Co alloy plate, a Ni/Co alloy mesh, a stainless steel mesh, and a stainless steel mesh embedded in acetylene black. According to some embodiments, the metallic substrate is a nickel mesh. According to some embodiments, the carbon-based substrate is carbon paper.

According to some embodiments, the process for obtaining $M^1$-$BH_4$ comprises the steps of:

providing a solution comprising a source of $M^3$ metal cations and a reductant comprising the element R;

immersing the cathode, an anode and a reference electrode into the solution; and applying a current between the anode and the cathode, while inducing a constant electric potential (E) on the cathode, as measured versus the reference electrode, thereby permitting reduction of $M^3$ and oxidation of the reductant to obtain the deposition of $M^3_xR$ alloy onto the cathode, the constant electric potential being lower than the reduction potential of the $M^3$ metal cation.

According to some embodiments, the induced constant cathode potential is between −0.8 and −1.44 Volts when measured versus standard hydrogen electrode (SHE). According to some embodiments, the current is applied at a current density of between 0.001 and 0.5 A/cm². According to some embodiments, the source of $M^3$ metal cations is a water-soluble salt of the $M^3$ metal. According to some embodiments, the water-soluble salt of the metal is selected from $CoCl_2$, $CoSO_4$, $Co(NO_3)_2$ or any combination thereof. According to some embodiments, the water-soluble salt is mixed with at least one of $FeCl_2$, $FeSO_4$, $Fe(NO_3)_2$, $NiCl_2$, $NiSO_4$, or $Ni(NO_3)_2$. According to some embodiments, the reductant is a water-soluble salt comprising the element R. According to some embodiments, the reductant is selected from hypophosphite salts, borohydride salts, aminoboranes, hydrazine and formaldehyde, or any combination thereof. According to some embodiments, the water soluble salt containing the element R is selected from $NaH_2PO_2$, $KBH_4$, $KBH_4$, $NaH_2PO_2$ and $KH_2PO_2$. According to some embodiments, the $M^3$ is present in the solution in a concentration of between 0.05 and 0.5 molar. According to some embodiments, the R is present in the solution in a concentration of between 0.1 and 2 molar. According to some embodiments, the $M^3$ and R are provided in the solution in a ratio of between 1:1 and 1:10. According to some embodiments, the pH of the solution is between 4 and 14.

According to some embodiments, the process for obtaining $M^1$-$BH_4$, further comprising (e) annealing the cathode at elevated temperatures under an inert gas atmosphere. According to some embodiments, the elevated temperature is between 200 and 800° C.

According to some embodiments, the metal borohydride decomposition catalyst as detailed herein, comprises a nickel mesh at least partially coated by a Co—P alloy.

Embodiments of the invention are directed to a metal-borohydride decomposition catalyst, the catalyst comprising a conductive substrate, at least partially coated by $M^3_xR$ alloy clusters, $M^3$ being a reduced metal, R being an element selected from P, B and N, and x being between 2 and 3, the $M^3_xR$ alloy clusters having a size of between about 0.3 and about 5 nm. According to some embodiments, $M^3$ is selected from Co, Ni, Fe, or any combination thereof. According to some embodiments, the conductive substrate is selected from a nickel plate, a nickel mesh, a cobalt plate, a cobalt mesh, a Ni/Co alloy plate, a Ni/Co alloy mesh, a stainless steel mesh, a stainless steel mesh embedded in acetylene black and carbon paper.

Embodiments of the invention are directed to a process for producing hydrogen gas, the process comprising contacting an aqueous solution of metal-borohydride with a metal-borohydride decomposition catalyst, as detailed herein, thereby providing the decomposition of the metal-borohydride and the release of hydrogen gas. According to some embodiments, the aqueous solution of metal-borohydride is contacted with a metal-borohydride decomposition catalyst at a temperature of between 5 and 95° C. According to some embodiments, the concentration of metal-borohydride in the solution is at least 3.5 molar upon contacting. According to some embodiments, the metal borohydride is selected from sodium borohydride, potassium borohydride, and lithium borohydride. According to some embodiments, the decomposition arrests upon cease of contact between the catalyst and the aqueous solution.

Embodiments of the invention are directed to a process for preparing a metal-borohydride decomposition catalyst, the process comprising depositing an alloy of formula Co—P onto a nickel-mesh, the deposition being carried out under induced constant cathode potential.

Further embodiments are directed to a device for the on-demand production of hydrogen gas from metal-borohydride, comprising a vessel for storing metal-borohydride aqueous solution and the metal-borohydride decomposition catalyst, as detailed herein, means for bringing the catalyst into contact with the metal-borohydride aqueous solution and means for ceasing the contact.

Further embodiments are directed to a metal-borohydride decomposition catalyst, as detailed herein, for use in decomposing metal-borohydride to hydrogen gas.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

DETAILED DESCRIPTION OF EMBODIMENTS OF THE INVENTION

Figure 1:
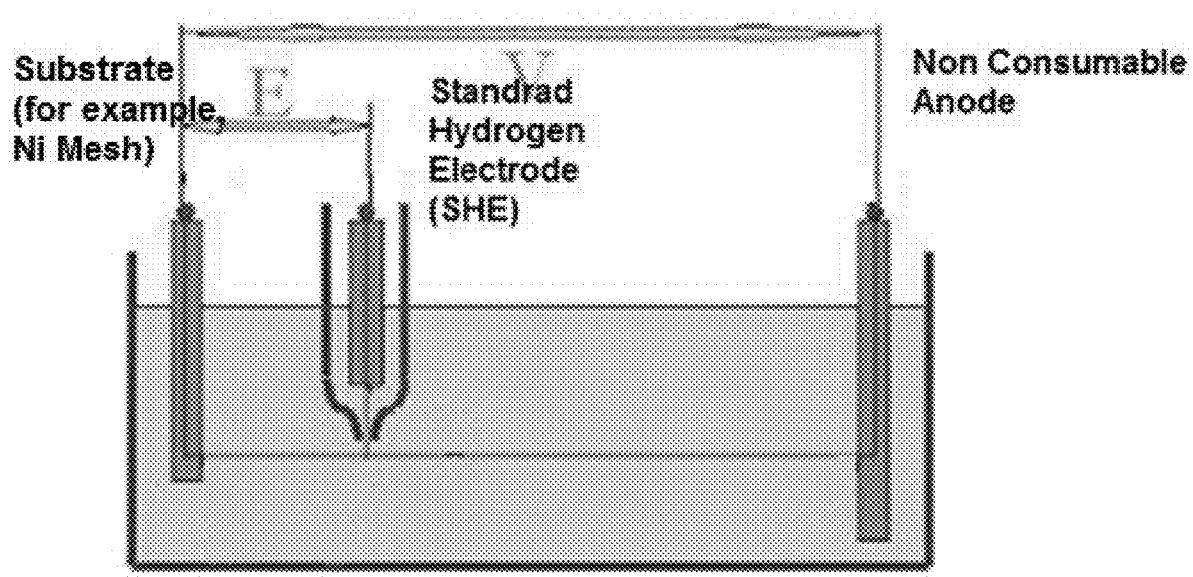
FIG. 1 is a schematic depiction of the system setup for induced deposition at a constant potential.

The present invention aims at providing a process for the synthesis of metal-borohydride, which may be used as a source for controlled, possibly on-demand, production of hydrogen. The process of the invention is based on the transformation of metal-metaborate (related to herein as "metal-$BO_2$" or "$M^1$-$BO_2$", wherein $M^1$ includes different types of metals selected from column 1 of the periodic table or alloys thereof) to metal-borohydride (related to herein as "metal-$BH_4$" or "$M^1$-$BH_4$", wherein $M^1$ is as defined above) in the presence of reducible metallic species. Processes of the invention include a single chemical reaction step and are carried out in a single pot (one-step, one-pot process), thereby providing basis for relatively simple commercial scale-up as well as cost-effectiveness.

Therefore, in one of its aspects, the invention provides a process for obtaining $M^1$-$BH_4$, the process comprising contacting $M^1$-$BO_2$ with a metal $M^2$ in the presence of molecular hydrogen ($H_2$), under conditions permitting the formation of $M^1$-$BH_4$, as detailed herein, wherein the $M^1$ is as detailed above and $M^2$ includes metals selected from the second column of the periodic table or alloys thereof, provided that $M^2$ is not Mg and $M^1$ is different from $M^2$. It is particularly noted that although $M^2$ is not Mg, it may be an alloy of Mg with any other metal or metals form the second column. According to some embodiments, $M^2$ is an alloy of any of Mg, Be and Ca.

In another aspect, the invention provides a process for obtaining $M^1$-$BH_4$, the process comprising contacting $M^1$-$BO_2$ with a metal $M^2$ at the presence of molecular hydrogen ($H_2$) under conditions permitting the formation of $M^1$-$BH_4$, as detailed herein Processes of the invention follow the reaction according to general equation (2):

$$M^1\text{-}BO_2 + M^2 + H_2 \rightarrow M^1\text{-}BH_4 + M^2\text{-oxide} \qquad \text{(eq. 2)}$$

$M^1$ is typically an "alkali metal", encompassing metals selected from column I of the periodic table of elements. In some embodiments, the alkali metal is selected from Li, Na, K, Rb, Cs and Fr.

Processes of the invention are based on redox reactions. The term "redox reaction" refers to a chemical reaction which is based on the transfer of electrons between species during the reaction, to thereby change the species' oxidation states. Under the conditions of the processes, $M^2$ is a reductant metal, i.e. $M^2$ undergoes oxidation (increases in oxidation state) by transferring electrons to the molecular hydrogen ($H_2$). Simultaneously, $H_2$ receives electrons from $M^2$, thereby undergoing reduction (decreasing in oxidation state).

Therefore, in some embodiments, $M^2$ is a metal (or alloy of metals) capable of reducing molecular hydrogen ($H_2$) to hydrides, thereby enabling the formation of $M^1$-$BH_4$ under the reaction conditions, as detailed herein.

$M^2$ metals suitable for the process of the invention may be those having a Pauling electronegativity value of ≤1.6 or alloys thereof. The "Pauling electronegativity" is a property of the metal element indicating the tendency of an atom to attract/donate electrons, and is provided in a dimensionless scale called the "Pauling scale". Without wishing to be bound by theory, the lower the Pauling electronegativity, the higher the tendency of the atom to donate electrons. Exemplary elements having a low Pauling electronegativity value are alkali metals, having a single electron in their outer shell which is relatively easily donated upon formation of a chemical bond.

Under certain conditions, it is possible that $M^2$ metals will form undesired hydrides under the process conditions. Thus, in some embodiments, $M^2$ is selected to be a metal capable of forming $M^2$-hydrides, such that the $M^2$-hydride has a decomposition temperature of less than about 750° C. (as measured at a pressure of 1 bar in air). This selection ensures the decomposition of the undesired $M^2$-hydrides by-products in situ during the process of the invention. In some embodiments, the $M^2$-hydride has a decomposition temperature of less than about 600° C., less than about 625° C., less than about 650° C., less than about 675° C., less than about 700° C., or less than about 725° C. As used herein, the term "about" is meant to cover±10% of the disclosed value, unless specifically mentioned otherwise.

In other embodiments, $M^2$ is a metal (or an alloy of metals) selected from column II of the periodic table of elements (namely, alkali and earth-alkali metals), and is typically selected from Be, Ca, Sr, Ba, and alloys thereof, as well as Mg alloys. In the context of the present invention, the term "alloy" is meant to encompass a material comprising at least two metal components, which may be at any compositional form and compositional ratio known in the art. Non-limiting examples of types of alloys encompassed by the present invention are solid solutions of metal elements, mixtures of metallic phases, or intermetallic compounds, being homogenous or heterogeneous in their composition.

In some other embodiments, $M^2$ is selected from Mg-alloys, Be, Ca, Sr, Ba, and alloys thereof, as well as alloys of Mg and other elements from the second column of the periodic table. In such embodiments, $M^2$ may be selected from Be, Ca, Be—Mg alloys, Be—Ca alloys, Mg—Ca alloys and Be—Mg—Ca alloys. According to some embodiments, the percentage of the Mg in the alloy may be between about 30-95%. According to some embodiments, the percentage of the Mg in the alloy may be between about 30-40%. According to some embodiments, the percentage of the Mg in the alloy may be between about 40-50%. According to some embodiments, the percentage of the Mg in the alloy may be between about 50-60%. According to some embodiments, the percentage of the Mg in the alloy may be between about 60-70%. According to some embodiments, the percentage of the Mg in the alloy may be between about 70-80%. According to some embodiments, the percentage of the Mg in the alloy may be between about 80-90%. According to some embodiments, the percentage of the Mg in the alloy may be between about 90-95%.

Unlike the processes known in the art, in which only Mg is used to convert metal-metaborate to metal-borohydride, the various $M^2$ metals and alloys used in processes of the invention are expected to have an influence on at least one parameter of the reaction, such as the reaction temperature, reaction time, pressure, heating rate, hydrogen introduction temperature and pressure, the activation energy for the conversion reaction and the like. For example, beryllium (Be) decreases hydride decomposition temperature, thereby allowing decrease in reaction temperatures. Another example is calcium (Ca), which is characterized by lower Pauling electronegativity than Mg, i.e. having a higher tendency to donate electrons. This yields a decrease of activation energy of reaction, hence allowing a decrease in the reaction temperature or time.

The process of the invention is carried out under conditions permitting or facilitating the transformation of $M^1$-$BO_2$ to $M^1$-$BH_4$. In some embodiments, these conditions are selected from at least one of temperature, pressure, overall time of reaction, heating rate and hydrogen introduction temperature and pressure.

According to some embodiments, the process of the invention is carried out at a temperature of between about 200 and about 1000° C. In some embodiments, the process is carried out at a temperature of between about 200 and about 900° C., between about 200 and about 800° C., between about 200 and about 700° C., between about 200 and about 650° C., or even between about 200 and about 600° C. In other embodiments, the process of the invention may be carried out at a temperature of between about 250 and about 1000° C., between about 300 and about 1000° C., between about 350 and about 1000° C., or even between about 400 and about 1000° C. In some other embodiments, the process of the invention may be carried out at a temperature of between about 350 and about 700° C.

According to other embodiments, the process of the invention is carried out at a $H_2$ pressure being at least about atmospheric $H_2$ pressure. In some other embodiments, the $H_2$ pressure is at least about 10 bars. According to some embodiments, the $H_2$ pressure is between about 10-60 bars. According to some embodiments, the $H_2$ pressure is between about 10-20 bars. According to some embodiments, the $H_2$ pressure is between about 20-30 bars. According to some embodiments, the $H_2$ pressure is between about 30-40 bars. According to some embodiments, the $H_2$ pressure is between about 40-50 bars. According to some embodiments, the $H_2$ pressure is between about 50-60 bars. According to some embodiments, the $H_2$ pressure is between about 25-35 bars. According to some embodiments, the $H_2$ pressure is about 30 bars.

Dry $M^1$-$BH_4$ is typically used for minimizing unwanted side reactions. Thus, according to some embodiments, $M^1$-$BH_4$ is anhydrous.

In order to afford efficient contact between $M^1$-$BH_4$ and $M^2$, each of $M^1$-$BO_2$ and $M^2$ may be provided in particulate form, for example, as powders or flakes, which particles may be of symmetrical or unsymmetrical shape, may be elongated having a rod-like shape, round (spherical), elliptical, pyramidal, disk-like, or any irregular shape. By some embodiments, $M^2$ has an average particle size of between about 0.1 and about 10 µm (micrometers). In other embodiments, $M^2$ has an average particle size of between about 1 and 10 µm. According to some embodiments, the $M^2$ particle size distribution is narrow, i.e., the material is considered to be monodispersed.

According to some embodiments, $M^2$ may be in excess, which may shift the equilibrium of the reaction to the formation of $M^1$-$BH_4$. Therefore, according to some embodiments, the ratio between the $M^1$-$BO_2$ and $M^2$ is between about 1:1 and about 1:10.

According to some embodiments, a catalyst may be added to the reaction, which may result in lowering the activation energy of the redox reaction. Thus, in some embodiments, the contacting of $M^1BO_2$ and $M^2$ is carried out in the presence of at least one catalyst. A reduction in the activation energy may subsequently lower the temperature in which the process is carried out by at least 50° C., at times even by at least 100° C., or even by at least 150° C., in comparison to the same process without a catalyst.

The catalyst may be selected from metals that form hydrides having decomposition temperatures similar to that of the $M^2$-hydirdes, thereby ensuring decomposition of undesired $M^2$-hydirdes as well as the catalyst hydrides during the process. In some embodiments, the catalyst may be selected from transition metals, such as Fe, Co, Cu, Ni, Ru, Pt, alloys and combinations thereof.

In embodiments where a catalyst is utilized, the process of the invention may further comprise separating the catalyst, derivatives and/or compounds thereof, including hydrides, from the reaction mass. According to some embodiments, the catalyst (or any form thereof, as detailed) is separated from the reaction mass, possibly after the completion of $M^1$-$BH_4$ formation.

In another aspect of the invention, there is provided a process for obtaining $M^1$-$BH_4$, the process comprising:
(a) introducing $M^1$-$BO_2$ and $M^2$ into a reaction vessel to form a reaction mixture;
(b) heating the reaction mixture under an inert atmosphere to a predetermined temperature; and
(c) introducing $H_2$ into the reaction vessel to thereby obtain a reaction product comprising $M^1$-$BH_4$,
wherein $M^1$ and $M^2$ are as defined above.

According to some embodiments, the inert atmosphere includes nitrogen, any noble gas, such as argon, or any other appropriate inert gas or combinations thereof.

According to some embodiments, $H_2$ is introduced into the reaction vessel in step (c) at a predetermined $H_2$ temperature, pressure and/or for a predetermined period of time.

In some embodiments, the predetermined $H_2$ temperature is between about 200 and 1000° C. In some embodiments, the predetermined $H_2$ temperature is between about 200 and 300° C. In some embodiments, the predetermined $H_2$ temperature is between about 300 and 400° C. In some embodiments, the predetermined $H_2$ temperature is between about 400 and 500° C. In some embodiments, the predetermined $H_2$ temperature is between about 500 and 600° C. In some embodiments, the predetermined $H_2$ temperature is between about 600 and 700° C. In some embodiments, the predetermined $H_2$ temperature is between about 700 and 800° C. In some embodiments, the predetermined $H_2$ temperature is between about 800 and 900° C. In some embodiments, the predetermined $H_2$ temperature is between about 900 and 1000° C. In some embodiments, the predetermined $H_2$ temperature is about 600° C. it is noted that the $H_2$ temperature defined herein is the temperature of the added $H_2$, the temperature of the reaction vessel when the $H_2$ is added, or both.

In some embodiments, the $H_2$ pressure is at least about 10 bars. According to some embodiments, the $H_2$ pressure is between about 10-60 bars. According to some embodiments, the $H_2$ pressure is between about 10-20 bars. According to some embodiments, the $H_2$ pressure is between about 20-30 bars. According to some embodiments, the $H_2$ pressure is between about 30-40 bars. According to some embodiments, the $H_2$ pressure is between about 40-50 bars. According to some embodiments, the $H_2$ pressure is between about 50-60 bars. According to some embodiments, the $H_2$ pressure is between about 25-35 bars. According to some embodiments, the $H_2$ pressure is about 30 bars.

In some embodiments, said predetermined time period is at least about 30 minutes. According to some embodiments, said predetermined time period is between about 10 minutes and four hours. According to some embodiments, said predetermined time period is between about 10 minutes and one hour. According to some embodiments, said predetermined time period is between about one and two hours. According to some embodiments, said predetermined time period is between about two and three hours. According to some embodiments, said predetermined time period is between about three and four hours.

$M^1$-$BO_2$ and $M^2$ may be introduced into the reaction vessel in any desired sequence, i.e. one after the other, vice-versa, or concomitantly, to form a homogeneous reaction mass.

At times, $M^1$-$BO_2$ and $M^2$ are introduced into the reaction vessel as a pre-prepared mixture.

According to some embodiments, the reaction mass includes at least $M^1$-$BH_4$ and $M^2$-oxide. According to some embodiments, the process of the invention may further comprise, step (d) for separating $M^1$-$BH_4$ from the reaction mass. According to some embodiments, step (d) is carried out by solvent extraction. In some embodiments, the solvent used in the extraction process is a polar solvent, which may be selected from liquid ammonia, amines, amides, alcohols and ethers. According to some embodiments, the extraction may be carried out by KOH and/or NaOH water-based solutions, thereby providing the $M^1$-$BH_4$ product in an aqueous solution form.

As detailed above, according to some embodiments, the activation energy of the reaction may be reduced. Therefore, in some embodiments, the reaction mass further comprises a catalyst, which at times may be selected from Fe, Co, Cu, Ni, Ru, Pt, alloys thereof and combinations thereof. The catalyst may be added to the reaction vessel following introduction of $M^1BO_2$ and $M^2$, concomitantly with introduction of one or both of $M^1BO_2$ and $M^2$, or may be a part of a reactants' mixture when such is pre-prepared in advance.

The catalyst may be typically added in the form of a powder or dispersed in a liquid carrier. In such embodiments, the catalyst may have, for example, a particle size of between about 1 and about 30 μm.

In some embodiments the ratio between the $M^1$-$BO_2$ and the catalyst is between about 1:0.01 and about 1:1.

In embodiments where catalyst is used, the process may further comprise step (e) of separating the catalyst (or any derivatives, compounds or alloys thereof) from the reaction mass, possibly, after the completion of the $M^1$-$BH_4$ formation.

In some embodiments, steps (d) and (e) are carried out sequentially, in any appropriate order, or concomitantly.

In a further aspect, the present disclosure provides a process for obtaining $M^1$-$BH_4$, the process comprising contacting $M^1$-$BO_2$ with a metal $M^2$ in the presence of molecular hydrogen ($H_2$) under conditions permitting the formation of $M^1$-$BH_4$, wherein $M^1$ and $M^2$ are as defined above. According to some embodiments, $M^1$ is a metal selected from Na, K and Li According to some embodiments, $M^2$ is an alloy of any of Be, Mg and Ca.

In yet a further aspect, the invention provides an $M^1$-$BH_4$ compound produced in the process described herein. In some embodiments, $M^1$-$BH_4$ is selected from $NaBH_4$, $KBH_4$ and $LiBH_4$.

Once a metal borohydride is obtained, e.g., by any of the methods detailed herein, it may be used as a fuel in a fuel cell, e.g., it may be reacted with water to provide hydrogen, according to the following equation:

$$\text{metal-}BH_4 + 2H_2O \rightarrow \text{metal-}BO_2 + 4H_2$$

According to some embodiments, as detailed above, a catalyst may be used in order to obtain hydrogen from metal borohydride. The catalyst may be selected from any known catalyst, such as metals that form hydrides having decomposition temperatures similar to that of the $M^2$-hydirdes, thereby ensuring decomposition of undesired $M^2$-hydirdes as well as the catalyst hydrides during the process. In some embodiments, the catalyst may be selected from transition metals, such as Fe, Co, Cu, Ni, Ru, Pt, alloys and combinations thereof.

According to some embodiments, Co-based alloys, having a specific surface structure, may be used as stable catalysts for the on-demand decomposition of metal-borohydrides. Unlike catalysts produced in known plating methods (for example electroless plating, electrodeposition and galvanic processes), catalysts prepared by the processes of the invention may be highly stable under metal-borohydride hydrolysis conditions and may provide steady hydrogen release rates, which may be advantageous for implementation in systems requiring controllable in-situ hydrogen generation. For example, $H_2$ may be produced on demand from a stable metal-$BH_4$ system, which does not release hydrogen unless contacted with an appropriate catalyst. The amount of the hydrogen evolved may be related to the surface area of the metal-$BH_4$ contacted with the catalyst and therefore, controlling that surface area may control the amount of hydrogen produced. Accordingly, when used in a fuel cell, the amount of hydrogen may be controlled to match the fuel cell hydrogen utilization demand, thereby maintaining the amount of free hydrogen in the system to be minimal, i.e., to be below a predefined level and accordingly, below the explosion limit. At any point the catalyst may be removed from the system, thereby providing a system in which the production of hydrogen may be concluded at any point, as required.

Accordingly, embodiments of the invention are directed to the use of a catalyst, as detailed herein, for producing a predetermined amount of hydrogen, wherein the production of hydrogen may be initiated and concluded at any time point during the reaction by contacting or separating the catalyst from the borohydride solution. It is noted that the borohydride solution is a stable borohydride solution, i.e., a solution that remains stable for about five years at room temperature unless contacted with a catalyst the decomposes the borohydride. For example, the catalyst may be prepared on a solid support, which may readily be introduced into the borohydride solution when the production of hydrogen is required or removed from the borohydride solution when it is required to conclude the production of hydrogen. The size of surface contact between the catalyst and the borohydride solution, as well as the length of time of the surface contact between the two, essentially determines the decomposition amount of the borohydride.

Thus, in one of its aspects, the invention provides a process for preparing a metal-borohydride decomposition catalyst, the process comprising depositing an alloy of formula $M^3_xR$ onto a cathode surface, the deposition being carried out under an induced constant cathode potential, wherein, in the formula $M^3_xR$, $M^3$ is a reduced metal, R is an element selected from P, B and N, and x is between 2 and 3.

The terms "decomposition catalyst" and/or "hydrolysis promoting catalyst" refer to a material, or composition of matter, that enable the reduction of the activation energy for decomposition of metal-borohydride in aqueous solutions. It is further noted that, according to context and if not specifically mentioned otherwise, if "catalyst" or "catalyst of the invention" of the like are referred to herein, they are also meant to refer to such decomposition catalysts. Upon contact between such decomposition catalysts and an aqueous solution of metal-borohydride, decomposition of the metal-borohydride occurs substantially immediately, often without the need to introduce additional energy into the system. In the context of the present disclosure, the term catalyst refers to a substrate at least partially coated by $M^3_xR$ alloy. Namely, the, at least partially, coated cathode resulting from the deposition process of the invention as detailed herein, is a catalyst suitable to be subsequently used for the decomposition of metal-borohydride.

In the context of the present invention, the term deposition refers to the induced coating of at least a portion of a surface, typically a cathode, by an $M^3_xR$ alloy. In processes of the invention, the deposition of the $M^3_xR$ alloy may be induced and controlled by applying an electric potential onto the surface to be coated, such that the electrical potential on the surface is maintained within a limited predefined range, e.g., a range of about −0.8 to 1.44V versus a standard hydrogen electrode (SHE). Namely, the electrical potential of the surface is controlled in comparison to the standard electrode, thereby controlling the affinity between of the surface to be coated and the $M^3_xR$ alloy during the deposition process. According to some embodiments, the surface is a metal mesh surface. According to some embodiments, the electrical potential of the surface is maintained within a range of between about −0.8 to 1.44V versus a standard hydrogen electrode (SHE).

Thus, unlike processes known in the art, the deposition process of the invention is carried out under an induced constant cathode potential, i.e. a process in which the electrical potential applied onto the cathode is maintained within a limited predefined range, which may be −0.8 to 1.44V versus a standard SHE. It is noted that throughout, when the terms "induced constant cathode potential", "constant cathode potential", "constant potential" and the like are used, they are intended to include a limited predefined range as detailed herein, which may be −0.8 to 1.44V versus a standard SHE, unless specifically mentioned otherwise.

Such process conditions may provide the formation of substantially homogenous coating of the $M^3_xR$ alloy onto the cathode, i.e. uniform $M^3_xR$ alloy cluster sizes and/or controlled stoichiometry. According to some embodiments, the $M^3_xR$ alloy is obtained at a cluster size of between 0.8 and 5 nm onto the surface of the cathode. When used in metal-borohydride decomposition processes, such controlled cluster size of the catalyst allows controllable decomposition of the metal-borohydride.

In order to obtain a controlled deposition process, the induced constant cathode potential in processes of the invention is typically lower than the reduction potential of $M^3$ cations. In some embodiments, the constant cathode potential is between about −0.8 and −1.44 Volts when measured versus standard hydrogen electrode (SHE).

In the context of the invention, the term cathode is meant to encompass an electrically conductive substrate, which is stable under the conditions of the deposition process of the invention, and allows efficient adherence of the $M^3_xR$ alloy onto its surface. The cathode may be of any shape or form, flexible or rigid, may be substantially two-dimensional (a thin flat substrate) or a three-dimensional curved (non-flat) surface. The substrate, i.e. cathode, can be of any smoothness, may have perforations or may be in the form of a plate (whole or perforated), a grid, a mesh or a porous substrate of any desired porosity.

The cathode may be prepared from a conductive material or composition. When the catalyst is subsequently used to decompose borohydirdes in solution, the substrate (i.e. cathode) may be selected such as to withstand exposure to the high temperatures formed during decomposition of borohydirde.

In some embodiments, the cathode may be selected from a metal mesh and/or a conductive carbon-based composition. In such embodiments, the cathode may be selected from a nickel plate, a nickel mesh, a cobalt plate, a cobalt mesh, a Ni/Co alloy plate, a Ni/Co alloy mesh, a stainless steel mesh, and a stainless steel mesh embedded in acetylene black. In other embodiments, the cathode is made of carbon paper. In some other embodiments, the cathode is a nickel mesh.

In the induced constant potential deposition process of the invention, the $M^3_xR$ alloy is deposited onto the cathode, such that at least a portion of the cathode's surface is coated by the $M^3_xR$ alloy. The portion (region) of the cathode's surface to be coated may be of any size and structure, the portion may be continuous or comprise several non-continuous sub-regions on the surface. In some embodiments, the at least one portion of the substrate's (or cathode's) surface is its entire surface.

$M^3_xR$ alloy (or $M^3$-R alloy) is meant to encompass a material comprising at least reduced metal $M^3$ and an element R selected from P, B and N. The components of the alloy, namely $M^3$ and R, may be at any compositional form known in the art. Non-limiting examples of types of alloys encompassed by the present invention are solid solutions of metal elements, mixtures of metallic phases, or intermetallic compounds, being homogenous or heterogeneous in their composition.

In some embodiments, x in the $M^3_xR$ alloy is between 2 and 3. In other embodiments, x is between 2.2 and 3.

The deposition processes of the invention may be based on redox reactions. The term "redox reaction" refers to a chemical reaction which is based on the transfer of electrons between species during the reaction, to thereby change the species' oxidation states. Under the conditions of the processes, a reductant compound, which comprises the element R, undergoes oxidation (increases in oxidation state) by transferring electrons to cations of metal $M^3$. Simultaneously, cations of $M^3$ receive electrons from the reductant, thereby undergoing reduction (decreasing in oxidation state). Thus, in the $M^3$-R alloy, $M^3$ is in a reduced state (reduced metal). The reduced metal refers to $M^3$ in the alloy compared to its oxidation state as a precursor (i.e. prior to the beginning of the deposition).

$M^3$ is a metal or an alloy of metals, which in some embodiments, may be selected from Co, Ni, Fe, or any combination thereof.

In some embodiments, $M^3$ is Co (cobalt).
In some embodiments, R is P (phosphorous).
In some embodiments, M is Co and R is P.

The deposition process of the invention may, in some embodiments, comprise the following steps:
(d) providing a solution comprising a source of metal cations of $M^3$ and a reductant comprising the element R;
(e) immersing the cathode, an anode and a reference electrode in the solution; and
(f) applying a current between the anode and the cathode, while inducing a constant electric potential (E) on the cathode (as measured versus the reference electrode), thereby permitting reduction of $M^3$ and oxidation of the reductant to obtain the deposition of $M^3_xR$ alloy onto the cathode, the constant electric potential being lower than the reduction potential of the $M^3$ metal cation.

The term solution should be given its broadest definition to encompass a liquid state in which the $M^3$ and R sources are, at least partially, and possibly entirely, dissolved in liquid medium. Typically, the solution is an aqueous solution, in which cations of $M^3$ and the reductant are dissolved. The solution may be prepared in advance or directly prior to employing the deposition process of the invention.

In some embodiments, the source of $M^3$ metal cations is a water-soluble salt or complex of the metal. According to some embodiments, the water-soluble salt of the metal may be selected from salts of cobalt (II). According to some embodiments, the water-soluble salt of the metal is selected from $CoCl_2$, $CoSO_4$, $Co(NO_3)_2$ or any combination thereof. According to some embodiments, said salt of Co(II) may be mixed with at least one of $FeCl_2$, $FeSO_4$, $Fe(NO_3)_2$, $NiCl_2$, $NiSO_4$, or $Ni(NO_3)_2$.

In some embodiments, the reductant is a water-soluble salt or complex comprising the element R. According to some embodiments, the reductant may be selected from hypophosphite salts, borohydride salts, aminoboranes, hydrazine and formaldehyde, or any combination thereof. In some embodiments, the reductant may be selected from $NaH_2PO_2$, $NaBH_4$, $KBH_4$, $NaH_2PO_2$ and $KH_2PO_2$.

$M^3$ and R are typically present in the solution at initial concentrations allowing the formation of the desired $M^3$-R alloy upon application of the deposition process conditions.

Thus, according to some embodiments, $M^3$ is present in the solution in a concentration of between about 0.05 and 0.5 molar (mole/liter).

In some embodiments, R is present in the solution in a concentration of between about 0.1 and 2 molar.

In some embodiments, the ratio of $M^3$ to R in the solution is between about 1:1 and about 1:10.

According to some embodiments, the pH of the solution is between about 4 and about 14.

In the deposition process of the invention, three electrodes are immersed in the deposition solution: a cathode, an anode and a reference electrode (see FIG. 1, presenting a nickel mesh cathode substrate, a non consumable anode and a standard hydrogen reference electrode).

The cathode is as described hereinabove. The anode may be prepared from the same or different material as that of the cathode; i.e. the anode may be prepared from any conductive material. In some embodiments, the anode and the cathode are prepared from the same material. The anode may have a similar or different geometry than that of the cathode. Typically, the anode is a plate (whole or perforated), a grid or a mesh.

In some embodiments, the size of the cathode may be similar to that of the anode. According to some embodiments, the size of the cathode is larger than that of the anode. In some embodiments, the size ratio between the anode and the cathode may be between 1:1 and 1:10.

The reference electrode is an electrode having a known chemical potential, which is used to measure the constant potential applied onto the cathode during the deposition processes of the invention. The reference electrode used in the process of the invention may be any suitable reference electrode known in the art. According to some embodiments, the reference electrode may be selected from a glass electrode (pH-electrode), a standard hydrogen electrode and a mercury-mercurous sulfate electrode.

In some embodiments, the constant potential and desired voltage are applied for a period of time ranging between about 1 and about 120 minutes.

To increase adhesion of the $M^3$-R alloy to the substrate (i.e. cathode surface), the cathode may be annealed. Therefore, in some embodiments, the process may further comprise (e) annealing the cathode at elevated temperatures under inert gas atmosphere. In such embodiments, the elevated temperature may be between about 200 and about 800° C. The inert gas may be any of the noble gases, including argon, nitrogen, or any other appropriate inert gas or combinations thereof. In another one of its aspects, the invention provides a catalyst produced by the process as herein described.

In some embodiments, the catalyst is a nickel mesh, at least partially coated by Co—P alloy.

Another aspect of the invention provides a catalyst for decomposition of metal-borohydride, the catalyst comprising a conductive substrate (i.e. a cathode), at least partially coated by $M^3_xR$ alloy clusters, $M^3$ being a reduced metal, R being an element selected from P, B and N, and x being between 2 and 3, the $M^3_xR$ alloy clusters having a size of between about 0.3 and about 5 nm.

It should be noted that the cluster size may be measured by any method known to a person skilled in the art. The term "cluster size" refers to the arithmetic mean of measured diameters of the $M^3_xR$-alloy clusters, wherein the diameters may range±25% of the mean.

As already noted above, the catalysts produced in a process of the invention may be utilized in hydrolysis of metal-borohydride for the production of hydrogen gas therefrom.

Thus, according to another aspect, the invention provides a process for producing hydrogen gas, the process comprising contacting an aqueous solution of metal-borohydride with a catalyst as described herein, thereby causing decomposition of the metal-borohydride and release of hydrogen gas.

In another aspect, the invention provides a process for producing hydrogen gas, the process comprising contacting an aqueous solution of metal-borohydride with a catalyst produced by a deposition process under induced constant electrical potential as described herein, thereby causing decomposition of the metal-borohydride and release of hydrogen gas.

In the hydrogen-production process, metal-borohydride, such as sodium borohydride, potassium borohydride and lithium borohydride, are decomposed to release hydrogen gas upon contact of the metal-borohydride with the catalyst. As used herein, the term contacting, or any lingual variation thereof, refers to the bringing together of the material to be decomposed (i.e., metal-borohydride substantially dissolved in an aqueous medium) and the catalyst, in such a way to allow intimate contact between them. The contacting may be, for example, by flowing the metal-borohydride aqueous solution over or through the catalyst, by immersing the catalyst in the metal-borohydride aqueous solution, etc.

In some embodiments, the initial concentration of metal-borohydride in said solution is at least about 3.5 molar. It is noted that the initial concentration is the concentration upon contacting, i.e., before a reaction with the cathode/catalyst occurs. In some embodiments, the initial concentration of metal-borohydride in said solution is between about 3.5 and about 12 molar.

In other embodiments, the contacting is carried out at a temperature of between about 5 and about 95° C.

Due to their high stability and ability to significantly reduce the metal-borohydride decomposition activation energy, the catalysts produced by the deposition process of the invention may be used to produce hydrogen on-demand. Therefore, in some embodiments, the metal-borohydride decomposition arrests upon cease of contact between the catalyst and the aqueous solution. In such embodiments, the arrest is substantially immediate upon cease of contact.

According to some embodiments, the decomposition of the metal-borohydride commences substantially immediately upon contact with the catalyst, and stops substantially immediately upon cease of such contact. Thus, hydrogen gas may be produced upon-demand, thereby providing the controlled release of hydrogen gas, tailored to the requirements of the relevant system utilizing said hydrogen gas.

In another aspect, the invention provides process for preparing a metal-borohydride decomposition catalyst, the process comprising depositing an alloy of formula Co—P onto a nickel-mesh, the deposition being carried out under induced constant cathode potential.

A further aspect of the invention provides a catalyst for decomposing metal-borohydride in aqueous solution, the catalyst comprising a nickel mesh at least partially coated by Co—P alloy deposited by a deposition process under induced constant potential as described herein.

In yet another aspect of the invention there is provided a device for on-demand production of hydrogen gas from metal-borohydride, comprising a vessel for storing metal-borohydride aqueous solution and a catalyst as described herein, the device further comprises means for bringing the catalyst into contact with said metal-borohydride aqueous solution and for ceasing said contact.

In another aspect, the invention provides a catalyst as herein described, for use in decomposing metal-borohydride to hydrogen gas. Accordingly, reactions, such as the decomposition of metal borohydrides to hydrogen gas, may be made more efficient by use of a catalyst, e.g., as detailed above.

According to other embodiments, the decomposition of metal borohydrides to hydrogen gas may be rendered more efficient by recycling any of the ingredients, e.g., recycling the metal oxide $M^2$-oxide, wherein $M^2$ is as defined above.

As detailed above, metal-borohydride may be prepared according to the following equation:

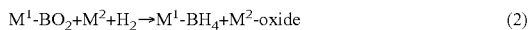

$$M^1\text{-}BO_2 + M^2 + H_2 \rightarrow M^1\text{-}BH_4 + M^2\text{-oxide} \qquad (2)$$

Thus, the reaction may require metal or alloy $M^2$ as a reactant, wherein the $M^2$-oxide product is prepared during the reaction. Accordingly, the process may be rendered more efficient by, e.g., preparing $M^2$ from the $M^2$-oxide, thereby cycling the reactants and products in the process.

According to some embodiments, $M^2$-oxide is reacted with a natural gas, such as $CH_4$, $C_2H_6$, $C_3H_8$, $C_4H_{10}$, or any other appropriate hydrocarbon or combinations thereof, to provide gaseous CO, $H_2$ and $M^2$.

According to some embodiments, the reaction of the $M^2$-oxide with the natural gas is at a temperature of between about 1400-2200° C. According to some embodiments, the reaction of the $M^2$-oxide with the natural gas is at a temperature of between about 1400-1600° C. According to some embodiments, the reaction of the $M^2$-oxide with the natural gas is at a temperature of between about 1600-1800° C. According to some embodiments, the reaction of the $M^2$-oxide with the natural gas is at a temperature of between about 1800-2000° C. According to some embodiments, the reaction of the $M^2$-oxide with the natural gas is at a temperature of between about 2000-2200° C.

Once cooled to a temperature of less than about 600-700° C., the $M^2$ metal or alloy will condensate as a microsphere, while the CO and $H_2$ remain in the gas phase and therefore, may be easily separated from $M^2$.

$M^2$ may then be reacted according to equation 2, and as detailed above, providing, inter alia, $M^2$-oxide, which, as detailed above, may be reacted with a natural gas, to provide $M^2$, repetitiously cycling between the $M^2$-oxide and $M^2$ throughout the process or throughout any part of the process, as desired.

EXAMPLES

In order to better understand how the present invention may be carried out, the following example is provided, demonstrating a process according to the present disclosure.

Example 1

Dry anhydrous $KBO_2$, having a particle size of about 30 μm, is mixed with a dry Mg-based alloy comprising 5% Ca and 95% Mg having a particle size of about 30 μm to form a homogenous mixture. The molar ratio between the $KBO_2$ and Mg may be between about 1:2-1:4 ($KBO_2$:Mg), wherein, in this example, a ratio of 1:2 was used.

The mixture was placed in a reaction vessel (reactor) and the reactor was sealed. The reactor was de-aired by Argon flow for several minutes.

The reactor was then heated to a temperature 400° C. Once the desired temperature was obtained, the rector was flushed with hydrogen gas. Hydrogen was introduced into the reactor in a pressure of 30 bars and the temperature was increased to 600° C. and held for two hours.

The reactor was then let to cool to room temperature and the product mixture was obtained. Leftover $KBO_2$ was subsequently extracted; metaborate to borohydride conversion yield was about 80%.

The following are comparative examples of catalysts produced in the electroless plating process known in the art and those produced according to processes of the present invention.

It is noted that, as stated hereinabove, the electrically-induced deposition process of the invention differs from plating processes known in the art (i.e. electrodeposition, electroplating, electroless plating, etc.) for the manufacture of catalysts. Typically, catalysts suitable for decomposition of metal-borohydride are produced in the art by electroless plating processes, which differ significantly from depositions processes of the present invention.

Electroless Plating Vs. Deposition at Induced Constant Potential

Briefly, electroless plating processes are auto-catalytic and do not require the application of external electrical power, and are therefore carried out without an anode or a counter-electrode. The electroless plating process is based on simultaneous redox reactions occurring spontaneously in the plating solution at the vicinity of a suitable substrate to be coated. Such redox reactions render the surface of the substrate with negative charges, allowing it to attract positive metal ions from the solution to form a coating layer. Since electroless plating is spontaneous only on the surface of a catalytic substrate, the substrate (i.e. the cathode) needs to be catalytic to the electroless reaction and the plated layer has to be catalytic as well to promote further deposition.

Metals are typically surface-charged when immersed in electrolytic solutions; the amount of charge is determined by the metal reactivity and defines the metal potential in a given electrolyte. If this potential is sufficient for catalysis of the electroless reaction of a certain metal cation, the cathode's metal surface behaves as a catalytic surface.

Although spontaneous, the electroless deposition reaction is slow, and in order to promote deposition the cathode's surface is often chemically pre-treated to become more catalytic. In addition, the electroless solution is often heated during the electroless plating process to elevated temperatures in order to increase the deposition rate.

As an outcome, the composition and structure of the deposited layers obtained in electroless plating are often non-homogenous, at least in alloy cluster sizes and an alloy composition. This non-homogeneity hinders effective decomposition of borohydride.

Example 2: Electroless Plating of Co—B on Nickel Mesh

A 60×20 mm cathode was cut out of a 0.14 mm wire, 1.56 LPM (lines per mm), 99.2% Nickel mesh. The cathode was cleaned by immersion in methylene chloride for 5 min., followed by 5 min. immersion in isopropyl alcohol, and then rinsed with deionized (DI) water.

In preparation for electroless plating, the cathode was immersed in 100 ml of an etching solution at 50° C., containing of 25 g $NH_4(SO_4)_2$ and 1 g of 98% $H_2SO_4$ in DI water until the mesh turned from metallic to grey. The cathode was rinsed with DI water and then immersed for 40 sec. in 50 ml accelerating solution at 25° C., containing 0.1 g $PdCl_2$ and 12 g of 37% HCl in DI water.

The cathode was rinsed again in DI water, and immersed in 200 ml of alkaline rinsing solution at 25° C. for 20 sec., the solution containing 6 g of $Na_2CO_3.12H_2O$ and 6 g of NaOH in DI water. The cathode was rinsed with DI water and submitted to electroless deposition.

An electroless plating solution was then prepared by dissolving 14.4 g of $NH_4Cl$, 29.3 g of $NH_4OH$ and 12.2 g of $CoCl_2.6H_2O$ in 200 ml of DI water. $NH_4OH$ was added until pH 10.5. Then 8.4 g of $KBH_2$ were added, and the solution was stirred for 2 hours.

In a 250 ml beaker, the 200 ml of the electroless plating solution was added and maintained at 25° C. The cathode was then immersed 55 mm deep in the solution and plated for 10 min. The cathode was then rinsed with DI water followed by rinsing with isopropyl alcohol.

The cathode was inserted into a pipe oven for annealing. Air was removed by argon flow, and the oven was heated to 400° C. at a rate of 5° C./minute. The oven was maintained at 400° C. for 40 minutes, and then left to cool down to 25° C.

Example 3: Electroless Plating of Co—P on Nickel Mesh

A 60×20 mm cathode was cut out of a 0.14 mm wire, 1.56 LPM, 99.2% Nickel mesh. The cathode was cleaned by immersion in methylene chloride for 5 min., followed by 5 min. immersion in isopropyl alcohol, and then rinsed with deionized (DI) water.

In preparation for electroless plating, the cathode was immersed in 100 ml of an etching solution at 50° C., containing of 25 g NH$_4$(SO$_4$)$_2$ and 1 g of 98% H$_2$SO$_4$ in DI water until the mesh turned from metallic to grey. The cathode was rinsed with DI water and then immersed for 40 sec. in 50 ml accelerating solution at 25° C., containing 0.1 g PdCl$_2$ and 12 g of 37% HCl in DI water.

The cathode was rinsed again in DI water, and immersed in 200 ml of alkaline rinsing solution at 25° C. for 20 sec., the solution containing 6 g of Na$_2$CO$_3$.12H$_2$O and 6 g of NaOH in DI water. The cathode was rinsed with DI water and submitted to electroless plating.

An electroless plating solution was then prepared by dissolving 8.8 g of C$_6$H$_8$O$_7$.H$_2$O, 13.9 g of (NH$_4$)$_2$SO$_4$ and 2.5 g of CoCl$_2$.6H$_2$O in 200 ml of DI water. NaOH was added until pH 6.5. Then 7 g of NaH$_2$PO$_2$ were added, and the solution was stirred for 2 hours.

In a 250 ml beaker, the 200 ml of the electroless plating solution was added and maintained at 85° C. The cathode was then immersed 55 mm deep in the solution and plated for 10 min. The cathode was then rinsed with DI water followed by rinsing with isopropyl alcohol.

The cathode was inserted into a pipe oven for annealing. Air was removed by argon flow, and the oven was heated to 400° C. at a rate of 5° C./minute. The oven was maintained at 400° C. for 40 minutes, and then left to cool down to 25° C.

Example 4: Deposition at Induced Constant Potential of Co—P on Carbon Paper

A 65×15 mm cathode was cut out of carbon paper. The cathode was cleaned by 5 min. immersion in isopropyl alcohol, and then rinsed with deionized (DI) water.

A 100×220 mm anode cut out of a 0.14 mm wire, 1.56 LPM, 99.2% Nickel mesh. The anode was cleaned by immersion in methylene chloride for 5 min., followed by 5 min. immersion in isopropyl alcohol, and then rinsed with deionized (DI) water.

A deposition solution was then prepared by dissolving 8.8 g of C$_6$H$_8$O$_7$.H$_2$O, 13.9 g of (NH$_4$)$_2$SO$_4$ and 2.5 g of CoCl$_2$.6H$_2$O in 200 ml of DI water. NaOH was added until pH 6.5. Then 7 g of NaH$_2$PO$_2$ were added, and the solution was stirred for 2 hours.

In a 250 ml beaker, the anode was placed near the sidewall. 200 ml of the deposition solution was added. The cathode was then immersed 55 mm deep in the solution. The anode was connected to the (+) terminal of a constant current power source and the cathode to the (−) terminal. The cathode was plated for 10 min at a constant current density of 0.03 A/cm$^2$. The cathode was then rinsed with DI water followed by rinsing with isopropyl alcohol.

The cathode was inserted into a pipe oven for annealing. Air was removed by argon flow, and the oven was heated to 400° C. at a rate of 5° C./minute. The oven was maintained at 400° C. for 40 minutes, and then left to cool down to 25° C.

Example 5: Deposition at Induced Constant Potential of Co—P on Acetylene Black with an Embedded Mesh A 60×15 mm cathode was cut out of 0.1 mm wire, 2 LPM, 316 stainless steel mesh embedded on one side of acetylene black sheet. The cathode was cleaned by 5 min. immersion in isopropyl alcohol, and then rinsed with deionized (DI) water. The cathode was then immersed in 100 ml etching solution at a 50° C., the solution containing of 25 g NH$_4$(SO$_4$)$_2$ and 1 g of 98% H$_2$SO$_4$ in DI water until mesh turned from metallic to grey. The cathode was rinsed and kept in DI water until deposition.

A 100×220 mm anode cut out of a 0.14 mm wire, 1.56 LPM, 99.2% Nickel mesh. The anode was cleaned by immersion in methylene chloride for 5 min., followed by 5 min. immersion in isopropyl alcohol, and then rinsed with deionized (DI) water.

A deposition solution was then prepared by dissolving 8.8 g of C$_6$H$_8$O$_7$.H$_2$O, 13.9 g of (NH$_4$)$_2$SO$_4$ and 2.5 g of CoCl$_2$.6H$_2$O in 200 ml of DI water. NaOH was added until pH 6.5. Then 7 g of NaH$_2$PO$_2$ were added, and the solution was stirred for 2 hours.

In a 250 ml beaker, the anode was placed near the sidewall. 200 ml of the deposition solution was added. The cathode was then immersed 55 mm deep in the solution. The anode was connected to the (+) terminal of a constant current power source and the cathode to the (−) terminal. The cathode was plated for 10 min at a constant current density of 0.03 A/cm$^2$. The cathode was then rinsed with DI water followed by rinsing with isopropyl alcohol.

The cathode was inserted into a pipe oven for annealing. Air was removed by argon flow, and the oven was heated to 400° C. at a rate of 5° C./minute. The oven was maintained at 400° C. for 40 minutes, and then left to cool down to 25° C.

Example 6: Deposition at Induced Constant Potential of Co—B on Nickel Mesh

A 60×20 mm cathode and a 100×220 mm anode were cut out of a 0.14 mm wire, 1.56 LPM, 99.2% Nickel mesh. The cathode and the anode were cleaned by immersion in methylene chloride for 5 min., followed by 5 min. immersion in isopropyl alcohol, and then rinsed with deionized (DI) water.

In preparation for deposition, the cathode was immersed in 100 ml of an etching solution at 50° C., containing of 25 g NH$_4$(SO$_4$)$_2$ and 1 g of 98% H$_2$SO$_4$ in DI water until the mesh turned from metallic to grey. The cathode was rinsed and kept in DI water until deposition.

A deposition solution was then prepared by dissolving 14.4 g of NH$_4$Cl, 29.3 g of NH$_4$OH and 12.2 g of CoCl$_2$.6H$_2$O in 200 ml of DI water. NH$_4$OH was added until pH 10.5. Then 8.4 g of KBH$_2$ were added, and the solution was stirred for 2 hours.

In a 250 ml beaker, the anode was placed near the sidewall. 200 ml of the deposition solution was added. The cathode was then immersed 55 mm deep in the solution. The anode was connected to the (+) terminal of a constant current power source and the cathode to the (−) terminal. The cathode was plated for 10 min at a constant current density of 0.03 A/cm$^2$. The cathode was then rinsed with DI water followed by rinsing with isopropyl alcohol.

The cathode was inserted into a pipe oven for annealing. Air was removed by argon flow, and the oven was heated to 400° C. at a rate of 5° C./minute. The oven was maintained at 400° C. for 40 minutes, and then left to cool down to 25° C.

Example 7: Deposition at Induced Constant Potential of Co—P on Nickel Mesh

A 60×20 mm cathode and a 100×220 mm anode were cut out of a 0.14 mm wire, 1.56 LPM, 99.2% Nickel mesh. The cathode and the anode were cleaned by immersion in methylene chloride for 5 min., followed by 5 min. immersion in isopropyl alcohol, and then rinsed with deionized (DI) water.

In preparation for deposition, the cathode was immersed in 100 ml of an etching solution at 50° C., containing of 25 g $NH_4(SO_4)_2$ and 1 g of 98% $H_2SO_4$ in DI water until the mesh turned from metallic to grey. The cathode was rinsed and kept in DI water until deposition.

A deposition solution was then prepared by dissolving 8.8 g of $C_6H_8O_7.H_2O$, 13.9 g of $(NH_4)_2SO_4$ and 2.5 g of $CoCl_2.6H_2O$ in 200 ml of DI water. NaOH was added until pH 6.5. Then 7 g of $NaH_2PO_2$ were added, and the solution was stirred for 2 hours.

In a 250 ml beaker, the anode was placed near the sidewall. 200 ml of the deposition solution was added. The cathode was then immersed 55 mm deep in the solution. The anode was connected to the (+) terminal of a constant current power source and the cathode to the (−) terminal. The cathode was plated for 10 min at a constant current density of 0.03 A/cm$^2$. The cathode was then rinsed with DI water followed by rinsing with isopropyl alcohol.

The cathode was inserted into a pipe oven for annealing. Air was removed by argon flow, and the oven was heated to 400° C. at a rate of 5° C./minute. The oven was maintained at 400° C. for 40 minutes, and then left to cool down to 25° C.

Morphology

Figure 2A:
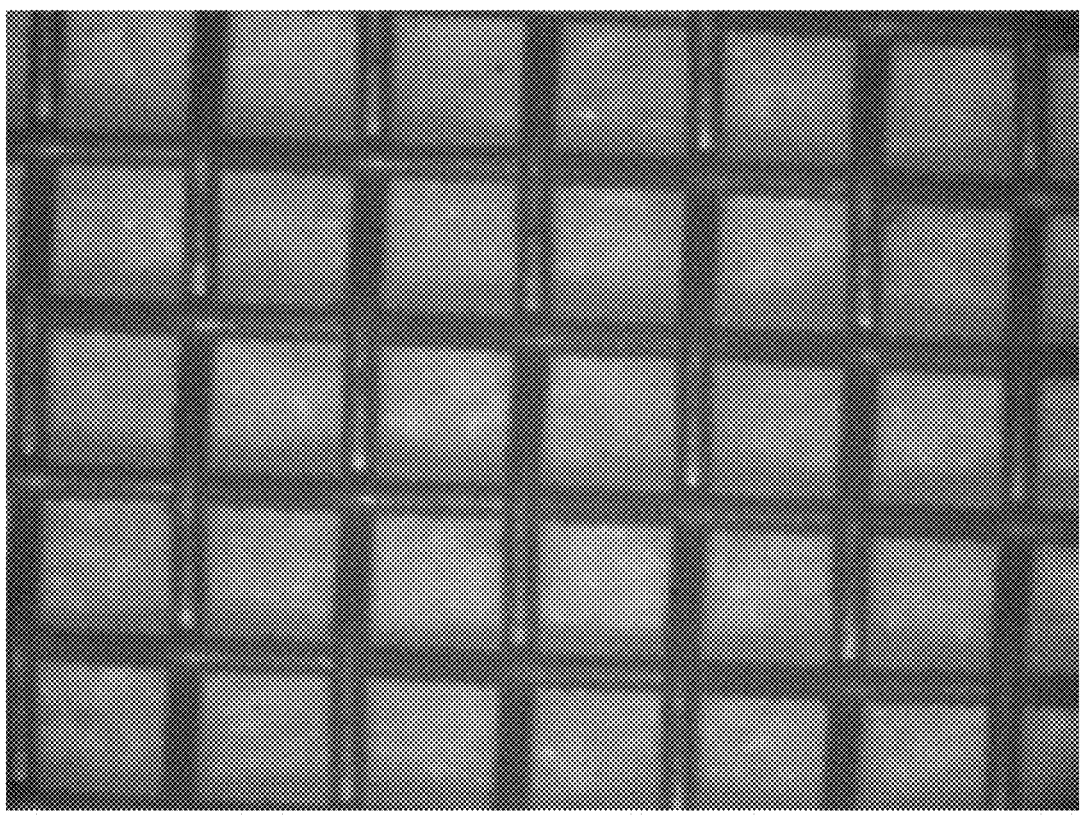
FIGS. 2A-2B are pictures of the catalyst-coated nickel cathodes following electroless plating: Co—B (FIG. 2A, Example 2), and Co—P (FIG. 2B, Example 3).
Figure 2B:
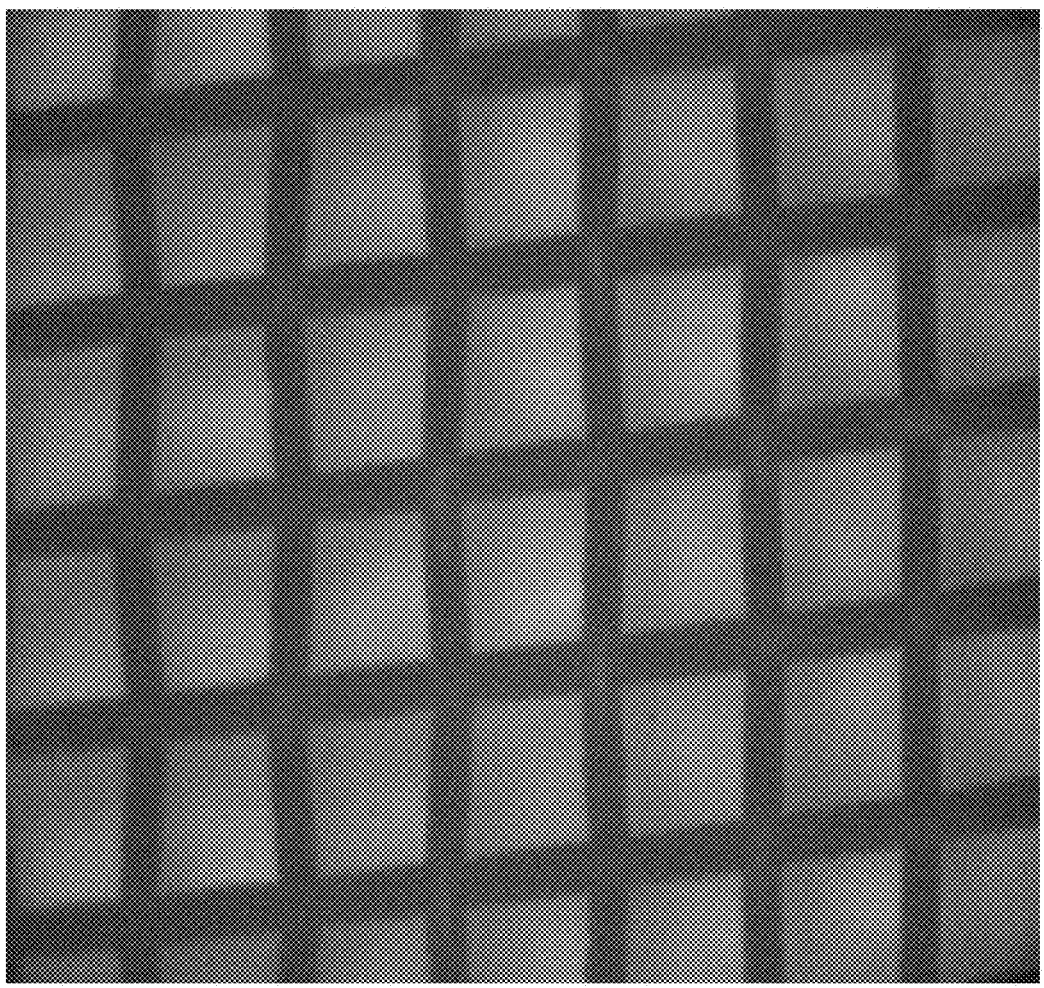
Figure 2C:
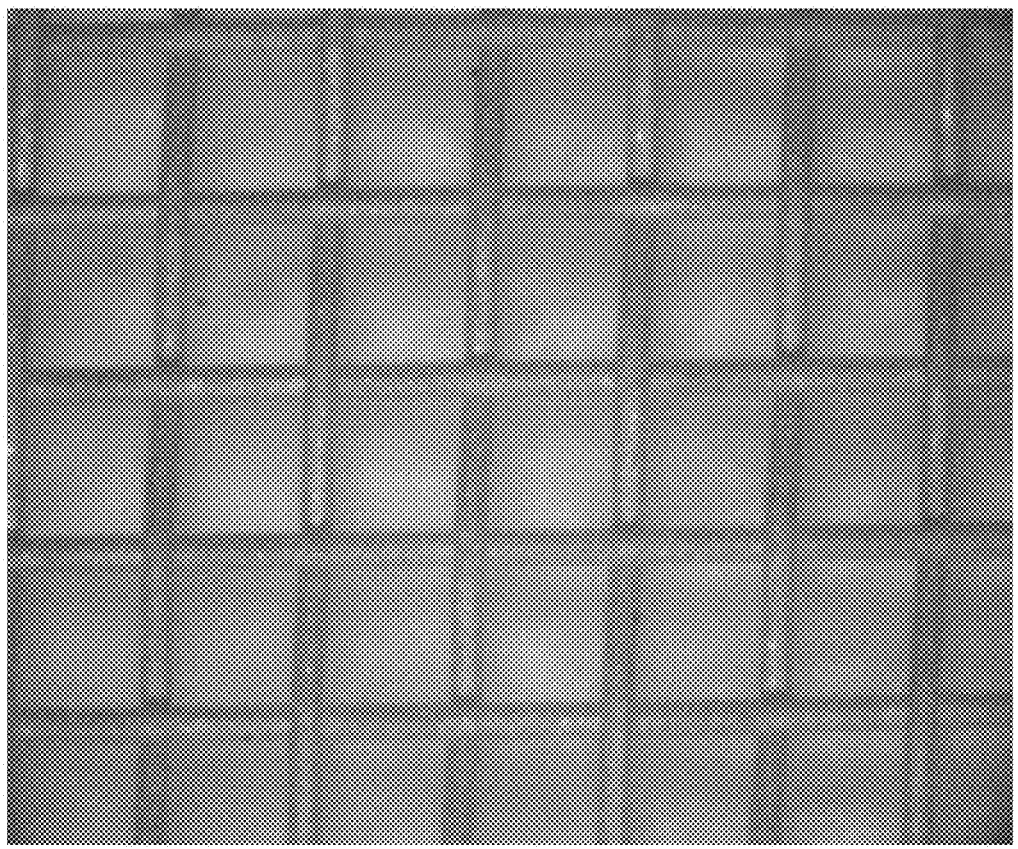
FIG. 2C is a picture of the catalyst-coated cathode following deposition at constant potential after 50 hours of a hydrogen flow test of Co—P on nickel mesh (FIG. 2C, Example 7).

FIGS. 2A-2C are images of catalyst-coated nickel cathodes following plating. As can be seen, Co—P deposited under induced constant-potential conditions shows a homogenous coating (FIG. 2C, Example 7), with relatively uniform Co—P cluster size and distribution when compared to Co—B and Co—P electroless plating products (FIGS. 2A-2B, Examples 2-3). Particularly, FIG. 2A presents the non-uniform coating pattern obtained by electroless deposition, FIG. 2B presents a coarse coating pattern obtain by electroless deposition, while FIG. 2C presents a uniform coating pattern obtained by the constant potential deposition method of the invention, wherein abnormal layers are not formed; rather, tiny uniform clusters are observed.

Catalytic Efficiency

Cathodes of Examples 2-7, with either Co—P alloy or Co—B alloy, were subjected to hydrogen flow test, for evaluating their catalytic efficiency of hydrogen production from potassium-borohydride.

An alkaline-$KBH_4$ solution was prepared from 1.5M KOH and 2.0M $KBH_4$ in DI water. 2.5 ml of the alkaline-$KBH_4$ solution was transferred to a suction flask and maintained in a water bath at 24-26° C. The outlet of the flask was linked by flexible tubing to a water-filled 100 ml burette. 1.0 cm$^2$ of catalyst-coated substrate (i.e. 1 cm$^2$ piece of the coated cathode of Examples 2-7) was added to the flask. The flask was then corked. Hydrogen release flow due to the catalytic hydrolysis of the $KBH_4$ was measured by the displacement of liquid in the burette by the hydrogen gas. The test was carried out for 50 hours.

As it is known that the catalysts undergo peeling due to the catalytic reaction conditions, it is expected that catalytic efficiency will decrease over time. To assess the durability of the catalysts, the ratio between the hydrogen flow at different times during the test and the initial flow was calculated to provide a % durability value [(flow)/(initial flow)].

Figure 3:
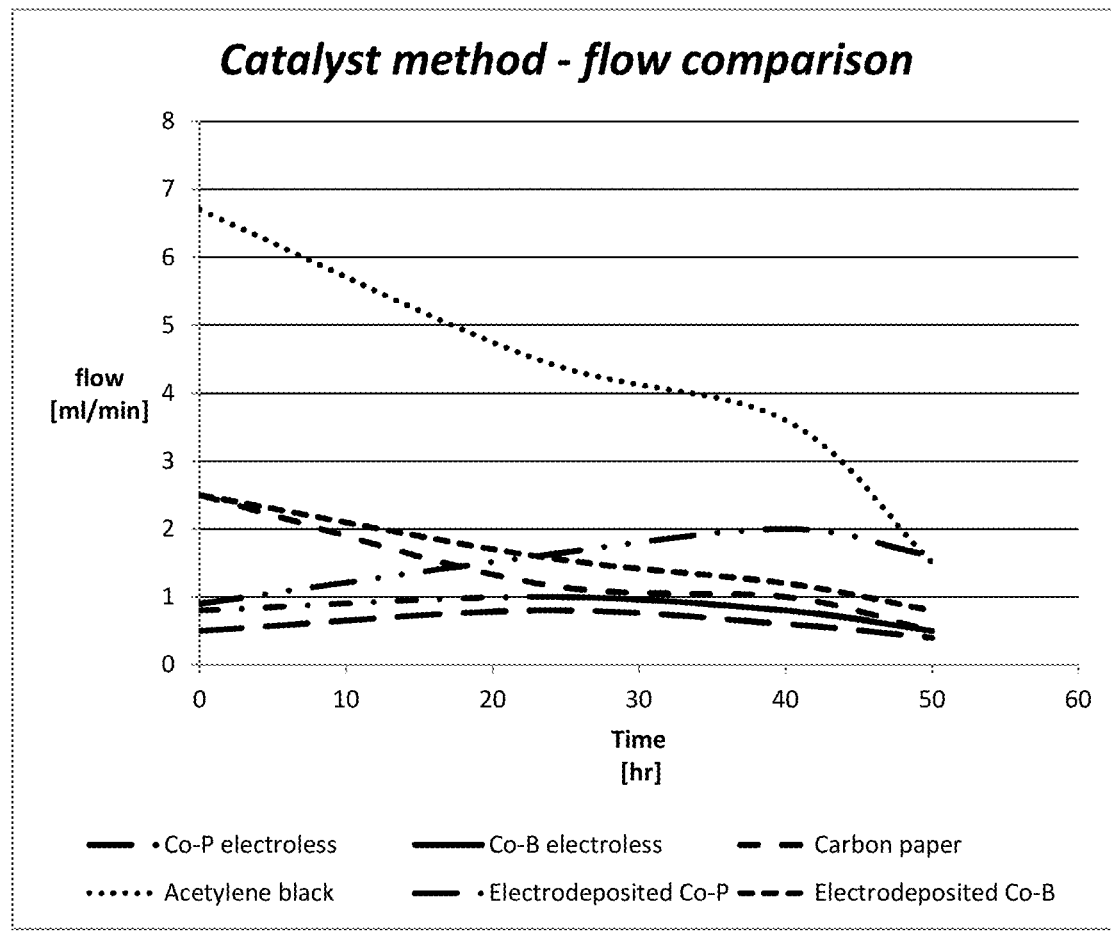
FIG. 3 shows hydrogen flow test results using catalysts produced according to Examples 2-7.
Figure 4:
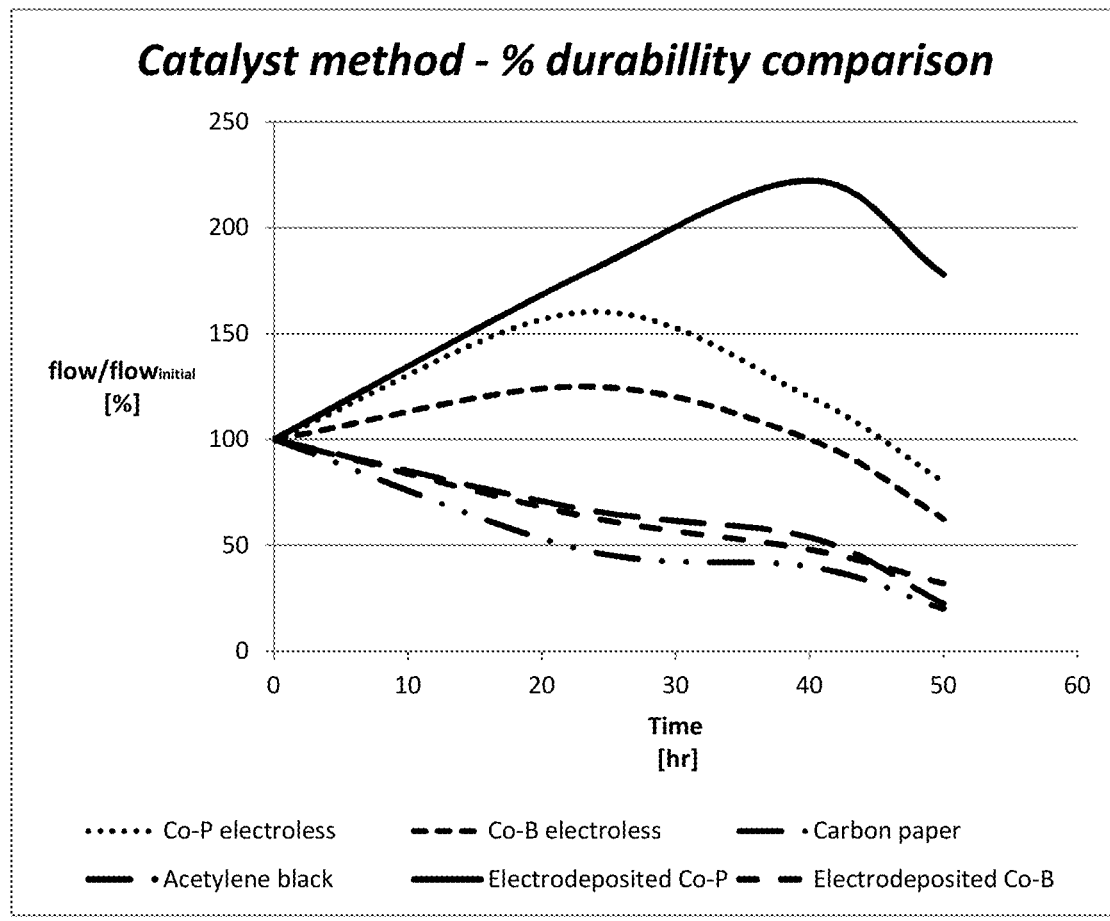
FIG. 4 shows % durability during catalytic reaction of catalysts produced according to Examples 2-7.

Measured hydrogen flow over time for the catalysts of Examples 2-7 are provided in FIG. 3. % and the durability of the catalysts is shown in FIG. 4.

First, it can be seen that catalysts produced by electroless plating (Examples 2-3) show a significant decrease in hydrogen flow, as well as decrease in % durability, attesting to their low stability in the alkaline solutions.

A higher hydrogen flow over time was obtained for all catalysts prepared by deposition at induced constant potential (Examples 4-7), compared to catalysts prepared by electroless plating (Examples 2-3). Further, although a higher initial hydrogen flow was observed for acetylene black substrate coated by Co—P, a sharp decrease in hydrogen production was observed over time. This is most likely due to peeling of the Co—P layer from the acetylene black substrate, as evident from the % durability test results.

Co—P on nickel mesh deposited by deposition at an induced constant potential, on the other hand, shows a steady hydrogen flow throughout the duration of the test. In addition, the Co—P layer proved to be of the highest stability during the test, showing an increase in % durability over time; meaning that Co—P does not undergo peeling or decomposition resulting from exposure to the alkaline solution. Clearly, from a commercial applicability point of view, the use of Co—P on nickel mesh prepared by deposition at induced constant potential seems to provide a potentially stable and controllable catalytic hydrolysis of $KBH_4$, as well as high stability of the catalysts itself over the entire reaction time.

Electrodeposition Vs. Deposition at Induced Constant Potential

Another process known in the art for obtaining coated surfaces is electrodeposition (or electroplating). Briefly, the electrodeposition process occurs upon application of current between a cathode and an anode, both immersed in a suitable electrolytes solution, permitting flow of charge between the anode and the cathode through the solution. A power source supplies a direct current to the anode (typically a constant current density), oxidizing the metal atoms of the anode, allowing them to dissolve in the solution. At the cathode, the dissolved metal ions in the electrolyte solution are reduced at the interface between the solution and the cathode, and precipitate to coat the surface of the cathode.

Thus, in electrodeposition processes the current is used to reduce the cations of the metal being plated by adjusting the cathode potential to a value at least matching the reducing potential of the cations. In order to promote deposition, the potential of the cathode is often higher from the reducing potential of the metal cations.

Example 8: Deposition at Induced Constant Potential Compared to Electrodeposition In order to exemplify the differences in both process and the catalyst resulting therefrom, samples of Co—P on a nickel mesh of Example 7 were compared to Co—P deposited on a nickel mesh produced in an electrodeposition process. As will be demonstrated below, electrodeposition processes do not yield a Co—P catalytic layer which is stable enough to allow its implementation as an efficient metal-borohydride decomposition catalyst.

The electrodeposition process was carried out according to the following protocol.

A 60×20 mm cathode and a 100×220 mm anode were cut out of a 0.14 mm wire, 1.56 LPM, 99.2% Nickel mesh. The cathode and the anode were cleaned by immersion in methylene chloride for 5 min., followed by 5 min. immersion in isopropyl alcohol, and then rinsed with deionized (DI) water.

In preparation for deposition, the cathode was immersed in 100 ml of an etching solution at 50° C., containing of 25 g $NH_4(SO_4)_2$ and 1 g of 98% $H_2SO_4$ in DI water until the mesh turned from metallic to grey. The cathode was rinsed and kept in DI water until deposition.

A deposition solution was then prepared by dissolving 8.8 g of $C_6H_8O_7 \cdot H_2O$, 13.9 g of $(NH_4)_2SO_4$ and 2.5 g of $CoCl_2 \cdot 6H_2O$ in 200 ml of DI water. NaOH was added until pH 6.5. Then 7 g of $NaH_2PO_2$ were added, and the solution was stirred for 2 hours.

In a 250 ml beaker, the anode was placed near the sidewall. 200 ml of the deposition solution was added. The cathode was then immersed 55 mm deep in the solution. The anode was connected to the (+) terminal of a constant current power source and the cathode to the (−) terminal. The cathode was plated for 10 min at a constant current density of 0.5 A/cm². The cathode was then rinsed with DI water followed by rinsing with isopropyl alcohol.

The cathode was inserted into a pipe oven for annealing. Air was removed by argon flow, and the oven was heated to 400° C. at a rate of 5° C./minute. The oven was maintained at 400° C. for 40 minutes, and then left to cool down to 25° C.

Figure 5A:
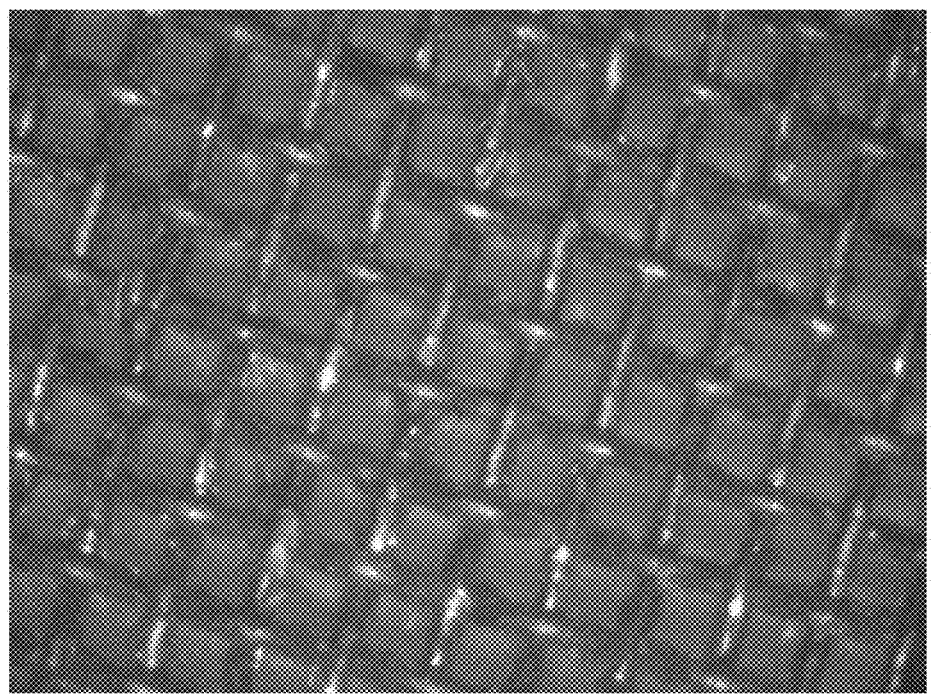
FIGS. 5A-5B show Co—P coated nickel mesh: as produced by electrodeposition (FIG. 5A) and electrodeposition catalysts after 50 hr of hydrogen flow test (FIG. 5B).
Figure 5B:
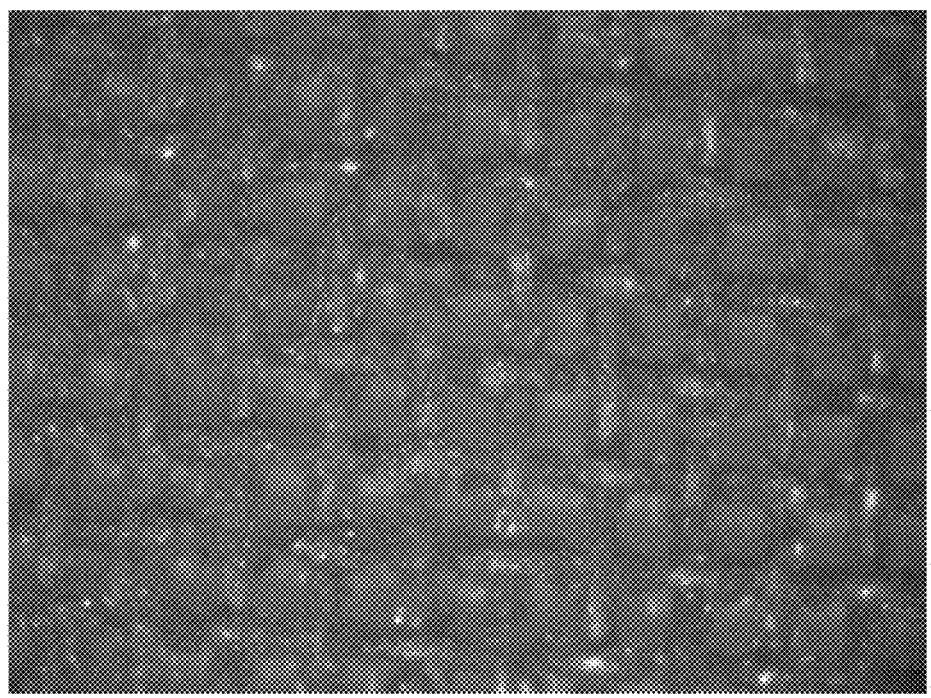

As can be seen from FIG. 5A, Co—P produced by galvanic electrodeposition shows a rough texture, with random structure and high variance cluster size, which results from the deposit peeling off from the substrate after usage, as presented in FIG. 5B. Further, problematic adhesion to the surface of the nickel mesh was observed. After 50 hours of hydrogen flow test, the electrodeposited sample did not show any adhesion of the Co—P to the nickel substrate and disintegration accrued even by hand touch due to severe mechanical stresses caused by exposure to the catalytic reaction conditions (see FIG. 5B, showing the same mesh as FIG. 5A, after disintegration and the partial peeling off of the deposition).

In the electrodeposition process the potential applied onto the cathode surpassed the reduction potential of the metal cation in the solution. Therefore, spontaneous deposition (similar to that of obtained in electroless plating) of Co—P occurs side by side with electrodeposition. As a result, the deposition process cannot be sufficiently controlled, and results in a non-homogenous deposited composition and/or cluster size distribution.

Furthermore, when trying to electro-deposit Co—P from an electroless solution that contains the reductant, solution decomposition and precipitation of the metal in the solution often occurs, leading to brittle deposit with poor adhesion to the cathode, which cannot be subsequently used as a stable catalyst.

Compared to this, Co—P of Example 7 (FIG. 2C) shows high stability of the catalytic Co—P layer after 50 hours of hydrogen flow test. No significant peeling or disintegration was observed, suggesting that Co—P deposited by induced constant potential deposition process may be used for extensively longer catalytic reaction durations.

Figure 6:
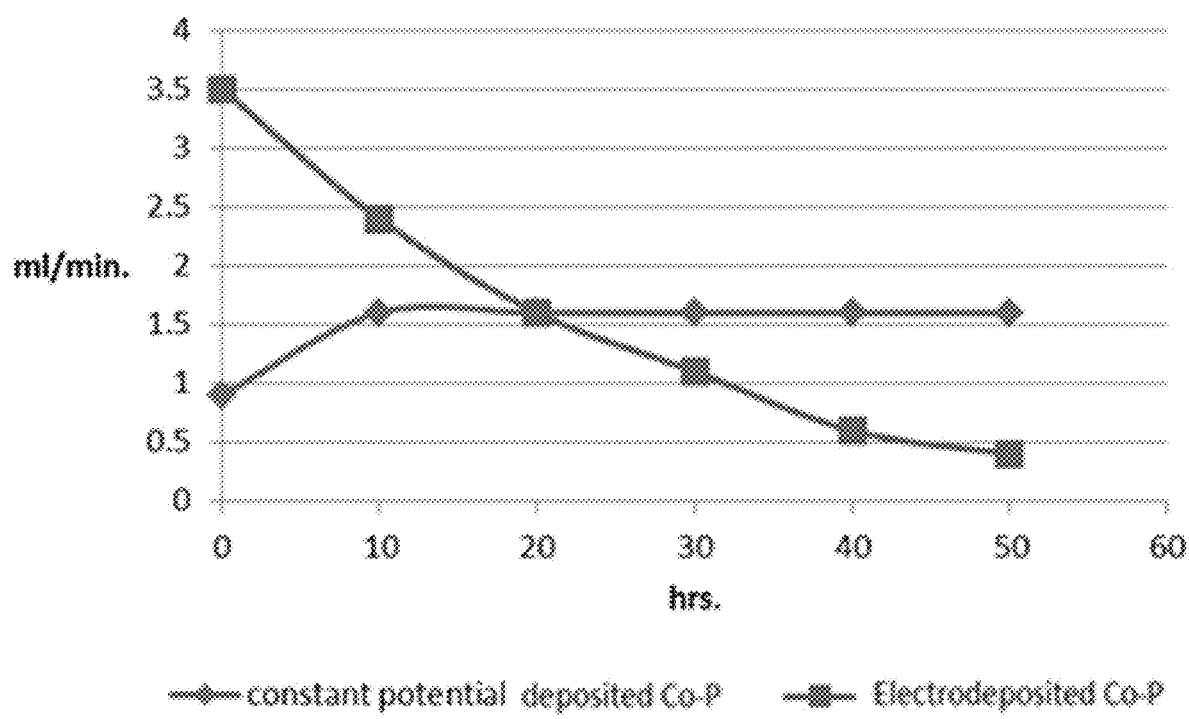
FIG. 6 shows hydrogen production rate vs. time of a catalyst Example 7 and of a catalyst produced by electrodeposition.
Figure 7:
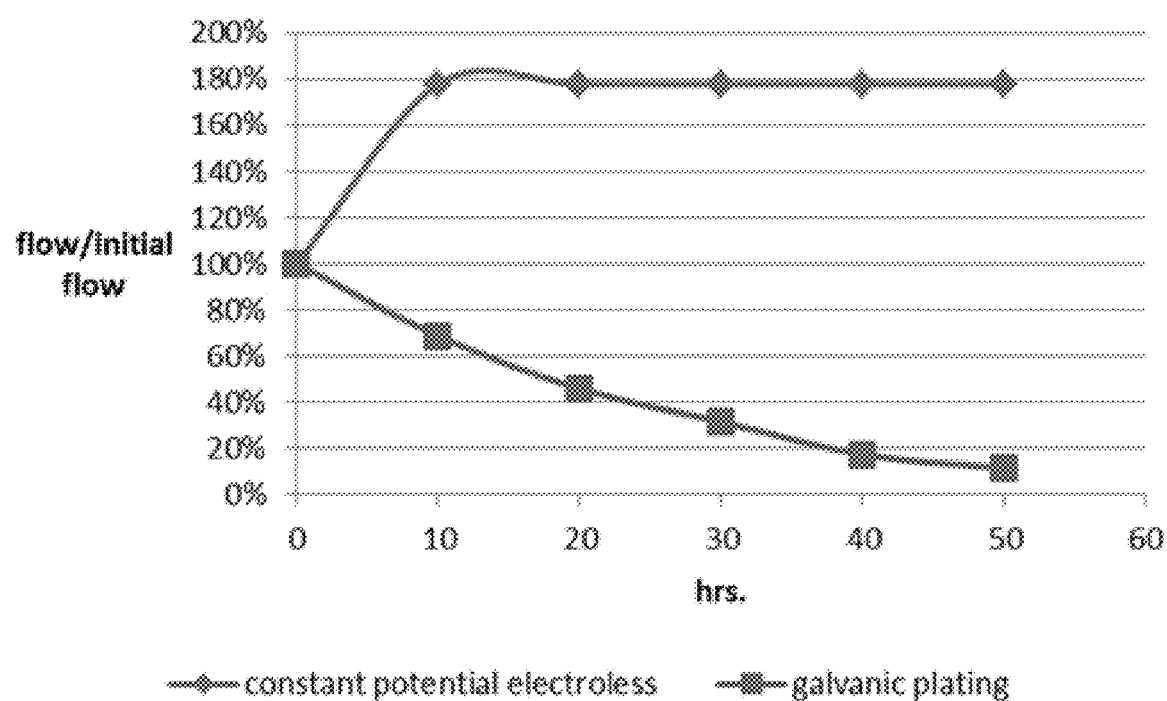
FIG. 7 shows hydrogen flow preservation vs. time of a catalyst of Example 7 and of a catalyst produced by electrodeposition.

Comparative hydrogen flow test results are shown in FIGS. 6-7. As can be seen, a sharp decrease in both hydrogen flow and % durability is observed for Co—P produced by electrodeposition, reaching a flow value of about 10% from its initial flow after 50 hours. Co—P of Example 7 shows both constant production of hydrogen and constant durability over the entire duration of the test.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

The invention claimed is:

1. A process for preparing a metal-borohydride decomposition catalyst, the process comprising depositing an alloy of formula $M^3_xR$ onto a surface of a cathode, the deposition being carried out in a solution under induced constant cathode potential, M being a reduced metal, R being an element selected from P, B and N, and x being between 2 and 3 wherein said process comprises the steps of:
    providing a solution comprising a source of $M^3$ metal cations and a reductant comprising the element R;
    immersing the cathode, an anode and a reference electrode into the solution;
    applying a current between the anode and the cathode, while inducing a constant electric potential (E) on the cathode, as measured versus the reference electrode, thereby permitting reduction of $M^3$ and oxidation of the reductant to obtain the deposition of $M^3_xR$ alloy onto the cathode, the constant electric potential being lower than the reduction potential of the $M^3$ metal cation; and
    annealing the cathode at elevated temperatures under an inert gas atmosphere.

2. The process according to claim 1, wherein said induced constant cathode potential is lower than the reduction potential of $M^3$ cations.

3. The process according to claim 1, wherein $M^3$ is selected from Co, Ni, Fe, and any combination thereof.

4. The process according to claim 1, wherein the cathode is selected from a carbon-based substrate, a metallic substrate and a carbon-based substrate embedded metal.

5. The process according to claim 1, wherein said reductant is selected from hypophosphite salts, borohydride salts, aminoboranes, hydrazine and formaldehyde, or any combination thereof.

6. The process according to claim 4, wherein the metallic substrate is selected from a nickel plate, a nickel mesh, a cobalt plate, a cobalt mesh, a Ni/Co alloy plate, a Ni/Co alloy mesh, a stainless steel mesh, and a stainless steel mesh embedded in acetylene black.

7. The process according to claim 1, wherein said reductant is a water-soluble salt comprising the element R.

8. The process according to claim 1, wherein said elevated temperature is between 200 and 800° C.

* * * * *